US012806787B1

(12) United States Patent
Trompeter

(10) Patent No.: US 12,806,787 B1
(45) Date of Patent: Nov. 24, 2026

(54) ROBOT CALIBRATION TECHNIQUES USING A TOOL CENTER POINT COMBINED WITH A USER COORDINATE SYSTEM

(71) Applicant: Mattrology, Inc., Washington Township, MI (US)

(72) Inventor: Matthew Trompeter, Washington Township, MI (US)

(73) Assignee: Mattrology, Inc., Washington Township, MI (US)

( * ) Notice: Subject to any disclaimer, the term of this patent is extended or adjusted under 35 U.S.C. 154(b) by 0 days.

(21) Appl. No.: 19/420,266

(22) Filed: Dec. 15, 2025

Related U.S. Application Data

(60) Provisional application No. 63/857,093, filed on Aug. 4, 2025.

(51) Int. Cl.
*B25J 9/16* (2006.01)
*B23K 26/08* (2014.01)
*B25J 15/00* (2006.01)

(52) U.S. Cl.
CPC ......... *B25J 9/1692* (2013.01); *B23K 26/0884* (2013.01); *B25J 9/1653* (2013.01); *B25J 15/0019* (2013.01)

(58) Field of Classification Search
CPC .... B25J 9/1692; B25J 9/1653; B25J 15/0019; B23K 26/0884
See application file for complete search history.

(56) References Cited

U.S. PATENT DOCUMENTS

| | | | |
|---|---|---|---|
| 3,010,471 | A | 11/1961 | Gross |
| 3,586,104 | A | 6/1971 | Hyde |

(Continued)

FOREIGN PATENT DOCUMENTS

| | | |
|---|---|---|
| EP | 1302285 | 4/2003 |
| JP | 2005059103 | 3/2005 |
| JP | 2008112294 | 5/2008 |

OTHER PUBLICATIONS

Handbook of Industrial Robots, 2nd Edition; "Precision and Calibration"; Shroer (Chapter 39); Editor Shimon Y. Nof; Wiley & Sons (16 pages).

(Continued)

*Primary Examiner* — Mohamad O El Sayah
(74) *Attorney, Agent, or Firm* — Dentons US LLP; Derek Auito

(57) ABSTRACT

A method for establishing a tool center point (TCP) for a robot is provided. The method includes supplying a laser-emitting device with first and second lasers oriented at a predefined angle. The device is placed in the robot's workspace and activated so that the emitted laser beams intersect at a visible intersection point. The robot is jogged to align its tool tip with the intersection point, and, for each of multiple joint configurations in which the tool tip is aligned, the corresponding set of joint angles is recorded in the robot's control system memory. The intersection point of the laser beams thereby defines the TCP for the robot without requiring sensors, digital models, digital feedback, or reference to internal robot mastering. This approach enables rapid, sensor-less, and model-free calibration of the robot's TCP directly from physical space, improving accuracy and efficiency in robotic operations.

4 Claims, 12 Drawing Sheets

(56) References Cited

U.S. PATENT DOCUMENTS

| | | | |
|---|---|---|---|
| 4,453,085 | A | 6/1984 | Pryor |
| 4,463,502 | A | 8/1984 | Fitzgerald |
| 4,698,572 | A | 10/1987 | Stone |
| 4,753,569 | A | 6/1988 | Pryor |
| 5,910,719 | A | 6/1999 | Thorne |
| 6,044,308 | A | 3/2000 | Huissoon |
| 6,352,354 | B1 | 3/2002 | Boillot |
| 6,408,252 | B1 | 6/2002 | De Smet |
| 6,529,852 | B2 | 3/2003 | Knoll |
| 6,622,794 | B2 | 9/2003 | Zisk |
| 6,802,489 | B2 | 10/2004 | Marr |
| 6,823,895 | B2 | 11/2004 | Hitchcock |
| 6,834,503 | B2 | 12/2004 | Freymann |
| 7,338,028 | B2 | 3/2008 | Zimmerling |
| 7,354,528 | B2 | 4/2008 | Cheng |
| 7,359,817 | B2 | 4/2008 | Ban |
| 7,428,922 | B2 | 9/2008 | Fripp |
| 7,521,002 | B2 | 4/2009 | Cheng |
| 7,547,415 | B2 | 6/2009 | Hataoka |
| 7,756,608 | B2 | 7/2010 | Brogardh |
| 7,945,349 | B2 | 5/2011 | Svensson |
| 7,979,159 | B2 | 7/2011 | Fixell |
| 8,180,487 | B1 | 5/2012 | Vangal-Ramamurthy |
| 8,286,705 | B2 | 10/2012 | Ocalan |
| 8,424,598 | B2 | 4/2013 | Roddy |
| 8,485,017 | B1 | 7/2013 | Trompeter |
| 8,584,692 | B2 | 11/2013 | Hyde |
| 8,584,762 | B2 | 11/2013 | Fripp |
| 8,857,508 | B2 | 10/2014 | Mazyar |
| 9,061,421 | B2 | 6/2015 | Trompeter |
| 9,114,534 | B2 | 8/2015 | Trompeter |
| 9,266,241 | B2 | 2/2016 | Trompeter |
| 9,669,546 | B2 | 6/2017 | Trompeter |
| 9,713,869 | B2 | 7/2017 | Trompeter |
| 2002/0174981 | A1 | 11/2002 | Den Boer |
| 2003/0159299 | A1 | 8/2003 | Goodrich |
| 2004/0093119 | A1 | 5/2004 | Gunnarsson et al. |
| 2004/0267405 | A1 | 12/2004 | Ingenhoven |
| 2007/0141963 | A1 | 6/2007 | Mortell |
| 2008/0023205 | A1 | 1/2008 | Craster |
| 2008/0234863 | A1 | 9/2008 | Pagel et al. |
| 2009/0157226 | A1 | 6/2009 | De Smet |
| 2009/0240372 | A1 | 9/2009 | Bordyn |
| 2009/0278273 | A1* | 11/2009 | Patterson ............ B29C 45/1759 264/161 |
| 2011/0129792 | A1 | 6/2011 | Berckmans, III |
| 2011/0214920 | A1 | 9/2011 | Vail, III |
| 2011/0297394 | A1 | 12/2011 | Vandelden |
| 2012/0024385 | A1 | 2/2012 | Gharaibah |
| 2012/0067577 | A1 | 3/2012 | Roddy |
| 2012/0186813 | A1 | 7/2012 | Ohta |
| 2012/0265341 | A1 | 10/2012 | Trompeter |
| 2012/0283874 | A1 | 11/2012 | Trompeter |
| 2012/0318510 | A1 | 12/2012 | Ocalan |
| 2013/0123982 | A1 | 5/2013 | Chiu et al. |
| 2013/0268226 | A1 | 10/2013 | Morfino |
| 2013/0318962 | A1 | 12/2013 | Joshi |
| 2014/0365007 | A1* | 12/2014 | Trompeter ............. B25J 9/1692 700/254 |
| 2016/0184994 | A1* | 6/2016 | Trompeter ............. B25J 9/1692 700/254 |
| 2016/0368147 | A1* | 12/2016 | Li .......................... B25J 9/1692 |
| 2017/0259435 | A1* | 9/2017 | Yoon ........................ B25J 18/02 |
| 2018/0079077 | A1* | 3/2018 | Yoon ...................... B25J 13/087 |
| 2020/0189112 | A1* | 6/2020 | Kuruvilla ............... B25J 9/1692 |
| 2020/0298409 | A1* | 9/2020 | Hsiao ................... B25J 19/0095 |
| 2021/0039259 | A1 | 2/2021 | Duprez et al. |
| 2022/0079692 | A1* | 3/2022 | Staunton ................ A61B 34/20 |
| 2022/0105640 | A1* | 4/2022 | Noren .................... B25J 9/1664 |
| 2023/0045651 | A1* | 2/2023 | Fang ...................... B25J 9/1692 |
| 2023/0129623 | A1 | 4/2023 | Hsu et al. |
| 2023/0390933 | A1 | 12/2023 | Danko et al. |
| 2024/0042598 | A1* | 2/2024 | Zhang .................... B25J 9/1692 |
| 2024/0401933 | A1* | 12/2024 | Aubauer ................ G01B 11/14 |
| 2025/0083315 | A1* | 3/2025 | Ding ...................... B25J 9/1638 |
| 2025/0169914 | A1* | 5/2025 | Gallop ................... A61B 34/30 |

OTHER PUBLICATIONS

PCT Search Report in related International Application No. PCT/US2026/039550, filed Aug. 3, 2026, dated Aug. 4, 2026 (4 pages).

PCT Written Opinion in related International Application No. PCT/US2026/039550, filed Aug. 3, 2026, dated Aug. 1, 2026 (16 pages).

* cited by examiner

ROBOT CALIBRATION TECHNIQUES USING A TOOL CENTER POINT COMBINED WITH A USER COORDINATE SYSTEM

CROSS-REFERENCE TO RELATED APPLICATION

The present disclosure claims the benefit of priority to U.S. Provisional Patent Application No. 63/857,093, filed on Aug. 4, 2025, the entire disclosure of which is hereby incorporated by reference in its entirety.

TECHNICAL FIELD

The present disclosure relates to calibration techniques for robots and, more particularly, to systems and methods for calibrating a robot by defining accurate tool center points and/or user coordinate systems directly from physical space.

BACKGROUND

Calibration of a robot is the process of accurately determining and setting the spatial relationship between the robot's end effector (such as a tool for working on, visualizing, or manipulating a workpiece) and a defined reference frame, which may be the robot's base or a user-defined coordinate system. The purpose of calibration is to ensure that the robot's programmed movements correspond precisely to real-world positions, thereby enabling repeatable and accurate execution of tasks. In contrast, mastering of a robot involves establishing the robot's internal reference positions, such as the zero points for each joint or axis. This step is necessary so that the robot's control system has an accurate understanding of its own geometry and kinematics. Both calibration and mastering are essential for achieving precise and reliable robotic operations, as they directly affect the robot's ability to interact with its environment as intended.

In conventional industrial settings, calibration and mastering of robots are typically centered around computer-aided design (CAD) systems. These systems are used to define, program, and align robotic operations. Generally, a digital representation of the robot's workspace—including fixtures, workpieces, and tools—is created within a CAD environment. Robot movements and programmed paths are planned offline, with all positions and orientations referenced to the coordinate system established by the CAD model. Once these programs are developed, they are transferred to the robot controller, which operates under the assumption that the physical arrangement on the shop floor exactly matches the virtual CAD environment.

To ensure that the robot's actual movements match the intended paths defined in the CAD model, a CAD-based calibration process is performed. This process usually involves teaching the robot specific points that correspond to known locations in the CAD model, using digital alignment routines, sensor feedback, or reference markers to synchronize the real-world setup with the virtual environment. Any discrepancies between the physical and digital setups must be identified and corrected, which often requires precise measurements, sensor data, and/or iterative adjustments. Additionally, the robot's internal kinematic model may be adjusted or "mastered" to align with CAD-derived positions, and verification steps are taken to compare the robot's actual positions—which are measured with sensors or cameras—to the expected positions from the CAD model. While this CAD-centric approach allows for sophisticated planning and simulation, it also introduces complexity and potential sources of error, especially when the physical setup does not perfectly match the digital plan or when precise alignment is difficult to achieve.

There have been some advancements aimed at improving robot calibration, but these methods remain closely tied to CAD models and offline programming workflows. They often depend on defining and updating shop floor reference frames and paths based on model-derived data, and/or require additional sensing hardware to facilitate alignment. For example, U.S. Pat. No. 8,485,017 describes a system that uses standardized North American Automotive Metric Standards (NAAMS) mounting to correct and touch up offline CAD programs on the shop floor. U.S. Pat. No. 9,713,869 similarly describes a system that uses CAD/offline programming to position and adjust the robot path relative to fixtures on the shop floor. Another example, U.S. Pat. No. 9,114,534 describes a system that combines a visual datum reference tool with manual or automatic tool finders, where the automatic version uses LED sensors for calibration and both versions define a robotic reference frame. Additional patents, such as U.S. Pat. Nos. 9,061,421, 9,266,241, and 9,669,546, describe systems that calibrate programs tied to CAD-defined placement, update CAD-based programs, establish shop floor zero locations relative to NAAMS and/or Numerical Control (NC)-mount coordinates, and download or touch up offline programs.

While the technology disclosed in these patents offer improvements and benefits over earlier methods, they remain closely linked to NAAMS/NC mounting conventions and require the downloading or modification of CAD-derived programs. Consequently, there is still a need for improved methods and tools for robot calibration and mastering that are less dependent on CAD models, offline programming, and specialized mounting standards.

SUMMARY

This disclosure recognizes that prior technologies for robot calibration and mastering are subject to a range of technological limitations and disadvantages, as described above. For example, conventional approaches often require precise mastering procedures, digital alignment routines, or adjustments to offline programming, all of which can introduce complexity, increase setup time, and create potential sources of error. This disclosure identifies the advantages of providing calibration and mastering techniques that avoid these requirements. In particular, the disclosed methods define accuracy from the outside in, enabling the robot to conform to real-world physical geometry rather than forcing the robot to match a digital abstraction or virtual model. Embodiments described herein do not require CAD data, digital modeling, or sensor feedback. As a result, calibration can be performed more rapidly and efficiently, without the need to adjust robot motion based on CAD-derived environments or to align offline programs to the robot's actual movements. In certain embodiments, the present disclosure provides improved calibration techniques for use with robot systems. Those calibration system and method are more straightforward and less resource intensive than previous technologies, resulting in improved precision at a lower cost in terms of both time and processing resources.

Embodiments of the present disclosure are directed to the practical application of improved methods and systems for mastering and/or calibrating the geometry of a robot by utilizing a physical laser-defined geometry. This approach fundamentally avoids the need to align the physical robot with a digital twin, as is common in workflows that rely on CAD-derived offline programs (OLPs). While these methods can be performed independently of CAD-derived environments, they can also operate within CAD-driven workflows when an OLP was created using a CAD-defined user coordinate system or "UFrame." In such cases, the laser-emitting device can be placed in a defined position such that its laser intersection point corresponds to the UFrame origin in the CAD model. This technique does not rely on importing CAD files, downloaded OLPs, or using sensor-based alignment routines to teach the TCP or UFrame. Instead, the geometry is defined directly from the physical intersection point of the laser beams, allowing the TCP and UFrame to be calibrated sensorlessly from physical space. Unlike prior systems that align robots to preexisting digital models, the disclosed methods calibrate the robot itself by defining accurate TCPs and user coordinate systems directly within the physical workspace.

The disclosed embodiments facilitate more accurate and efficient robot mastering. Robot mastering, as used herein, refers to the process of identifying and setting the actual geometrical parameters within the robot's kinematic structure. This process ensures that the robot's movements are precise, and that the robot can perform tasks with a high degree of accuracy. Mastering is essential for calibrating the joints of the robot and aligning them with their intended positions, which is critical for applications that demand high precision.

For robot mastering validation and/or recovery, the disclosed methods employ a laser-emitting device that projects intersecting laser beams to define a TCP. The robot's tool tip is then manually aligned to the TCP at multiple riser-mounted fixture positions within the robot's workspace. Each riser location is selected to represent a known spatial point in a user-defined coordinate system. In some embodiments, actual joint angles are recorded at these points and compared to expected values derived from inverse kinematics. This enables sensor-less mastering validation and recovery, without the need for CAD models, mastering fixtures, or internal encoder tools.

In one aspect, the present disclosure provides a method for establishing a tool center point (TCP) for a robot comprising a tool tip, a plurality of joints configured to move the tool tip within a workspace, and a control system configured to control movement of the joints, the method including: positioning a laser-emitting device within the workspace, the laser-emitting device including: a first laser configured to emit a first laser beam along a first defined direction; and a second laser configured to emit a second laser beam along a second defined direction, the first and second directions having a predefined relative orientation; activating the first and second lasers such that the emitted first and second laser beams intersect to form a detectable intersection point within the workspace; jogging the robot to align the tool tip with the intersection point, the alignment confirmed by operator observation; and recording, in a memory of the control system, joint angle data associated with a plurality of joint configurations in which the tool tip is aligned with the intersection point; computing, via the control system, the TCP based on the recorded joint angle data without relying on factory mastering data, internal encoder values, or external sensors; and establishing the TCP by adopting the computed TCP within the control system for use in controlling robot movements.

In examples, the method further includes moving the tool tip along a first laser-defined linear path to define an X axis of a workspace coordinate system; recording, in the memory, joint angle data corresponding to positions of the tool tip along the X axis; moving the tool tip along a second laser-defined linear path to define a Y axis of the workplace coordinate system; recording, in the memory, joint angle data corresponding to positions of the tool tip along the Y axis; and defining the workspace coordinate system based on the joint angle data recorded along the X axis and Y axis.

In examples, the method further includes determining kinematic model parameters that relate joint angles to spatial positions of the tool tip based on the recorded joint angle data for the TCP and the X and Y axes; and storing the kinematic model parameters in the memory for use in subsequent robot movements. In examples, the method further includes determining a misalignment between the tool tip and the first laser beam at a position along the first laser-defined path; jogging the robot to correct the misalignment; and updating the recorded joint angle data for the corrected position. In examples, the method further includes performing deviation mapping by moving the robot along at least the first laser-defined path; recording, along the first laser-defined path, a deviation between a position of the tool tip and a position of the first laser beam; and estimating robot accuracy based on the recorded deviations wherein the estimated robot accuracy is established without using sensors or external measurement tools. In examples, the tool tip comprises a photo-responsive material that changes color or emits light when struck by one or both of the first and second laser beams. In examples, the method further includes projecting the first laser beam onto an object to form a laser spot; and aligning the tool tip with the intersection point by adjusting the robot until the tool tip obstructs the first laser beam and reduces a size of the laser spot. In examples, the method further includes modifying the workspace; determining joint angles of the robot at predefined positions in the modified workspace using the laser-emitting device; calculating, based on the determined joint angles, a logical transform between the original workplace coordinate system and a new workplace coordinate system for the modified workplace; and defining the new workplace coordinate system in the control system using the logical transform. In examples, an angle between the first and second laser beams at the detectable intersection point is in a range from about 40 to 90 degrees. In examples, the first and second directions are orthogonal to each other.

According to another aspect, the present disclosure provides a method for mastering a robot comprising a tool tip, a plurality of joints configured to move the tool tip within a workspace, and a control system configured to control movement of the joints, the method including: recording, in a memory of the control system, joint angles of the robot while the tool tip is at one or more known positions within a user-defined coordinate system; computing expected joint angles for the known positions using an inverse kinematic model based on a previously established tool center point (TCP); determining joint angle deviations by comparing recorded joint angles to expected joint angles; applying the deviations as joint mastering offsets to update an internal joint configuration or kinematic configuration, wherein the method is performed without using factory mastering data, internal encoder values, or external sensors.

In examples, recording the joint angles includes: providing a laser-emitting device comprising a first laser configured to emit a first laser beam in a first direction and a second laser configured to emit a second laser beam in a second direction, wherein a relative orientation of the first direction and second direction is predefined; and at each of a plurality of mastering positions in the workspace: activating the first laser and the second laser such that the emitted first laser beam and the emitted second laser beam intersect at an intersection point defined relative to the mastering position; jogging the robot to align the tool tip with the intersection point, and recording, in the memory, the joint angles after alignment.

In examples, the method further includes performing a Jacobian-based least-squares operation using the recorded joint angles at the plurality of mastering positions; and updating the internal kinematic configuration based on a result of the Jacobian-based least-squares operation.

According to another aspect, the present disclosure provides a method for restoring joint mastering of a robot comprising a tool tip, a plurality of joints, and a control system storing configuration data and encoder pulse counts associated with a previously established tool center point (TCP), the method including providing a laser-emitting device to emit at least two coplanar laser beams that intersect at an intersection point within a workspace corresponding to the previously established TCP; jogging the robot to align the tool tip with the intersection point; and for each joint, adjusting a joint mastering value by incrementally moving the joint until an encoder pulse count of the joint matches a previously recorded pulse count associated with the previously established TCP.

In examples, aligning the tool tip includes: providing on the tool tip a light-responsive material to change appearance when struck by at least one of the two coplanar laser beams; or projecting at least one of the two coplanar laser beams onto an object to form a laser spot and detecting alignment by observing reduction in size of the spot when the tool tip obstructs the at least one of the two coplanar laser beams.

According to another aspect, the present disclosure provides a method for restoring joint mastering of a robot the robot, the robot including: a tool tip; a plurality of joints; and a control system storing configuration data and encoder pulse counts associated with a previously established tool center point (TCP); and a laser-emitting device configured to emit at least two coplanar laser beams that intersect at an intersection point within a workspace of the robot, wherein the intersection point corresponds to the previously established TCP; wherein the control system is configured to: jog, based on a user input a control interface, the robot to align the tool tip with the intersection point; and for each joint, adjust a joint mastering value by incrementally moving the joint until an encoder pulse count of the joint matches a previously recorded pulse count associated with the previously established TCP.

In examples, the tool tip includes a light-responsive material to change appearance when struck by at least one of the two coplanar laser beams; or the system further comprises an object to form a laser spot positioned in the workspace to detect alignment by observing reduction in size of the spot when the tool tip obstructs the at least one of the two coplanar laser beams.

According to another aspect, the present disclosure provides a kit including: a laser-emitting device including: a first laser configured to emit a first laser beam along a first defined direction; and a second laser configured to emit a second laser beam along a second defined direction, the first and second directions having a predefined relative orientation; wherein, after the first and second lasers are activated, the emitted first and second laser beams intersect to form a detectable intersection point within a workspace; and instructions configured to direct performance of a method for establishing a tool center point (TCP) for a robot comprising a tool tip, a plurality of joints configured to move the tool tip within a workspace, and a control system configured to control movement of the joints, the method including: positioning a laser-emitting device within the workspace, the laser-emitting device including: a first laser configured to emit a first laser beam along a first defined direction; and a second laser configured to emit a second laser beam along a second defined direction, the first and second directions having a predefined relative orientation; activating the first and second lasers such that the emitted first and second laser beams intersect to form a detectable intersection point within the workspace; jogging the robot to align the tool tip with the intersection point, the alignment confirmed by operator observation; and recording, in a memory of the control system, joint angle data associated with a plurality of joint configurations in which the tool tip is aligned with the intersection point; computing, via the control system, the TCP based on the recorded joint angle data without relying on factory mastering data, internal encoder values, or external sensors; and establishing the TCP by adopting the computed TCP within the control system for use in controlling robot movements.

According to another aspect, the present disclosure provides a system for establishing a tool center point (TCP) for a robot, the system including: the robot, wherein the robot includes a tool tip; a plurality of joints configured to move the tool tip within a workspace; a control system configured to control movement of the joints; and a laser-emitting device within the workspace, the laser-emitting device including: a first laser configured to emit a first laser beam along a first defined direction; and a second laser configured to emit a second laser beam along a second defined direction, the first and second directions having a predefined relative orientation; wherein, upon activation of the first and second lasers, the emitted first and second laser beams intersect to form a detectable intersection point within the workspace; wherein the control system is configured to: jog, based on a user input a control interface, the robot to align the tool tip with the intersection point, the alignment confirmed by operator observation; and record, in a memory of the control system, joint angle data associated with a plurality of joint configurations in which the tool tip is aligned with the intersection point; compute the TCP based on the recorded joint angle data without relying on factory mastering data, internal encoder values, or external sensors; and establishing the TCP by adopting the computed TCP within the control system for use in controlling robot movements.

In examples, the control system is further configured to: record, in the memory, joint angle data corresponding to positions of the tool tip along an X axis, wherein the X axis is defined by a first laser-defined linear path; record, in the memory, joint angle data corresponding to positions of the tool tip along a Y axis, wherein the Y axis is defined by a second laser-defined linear path; and define a workspace coordinate system based on the joint angle data recorded along the X axis and Y axis.

According to another aspect, the present disclosure provides a system for mastering a robot, the system including: the robot, the robot comprising: a tool tip; a plurality of joints configured to move the tool tip within a workspace; and a control system configured to control movement of the joints, the control system configured to: record, in a memory of the control system, joint angles of the robot while the tool tip is at one or more known positions within a user-defined coordinate system; compute expected joint angles for the known positions using an inverse kinematic model based on a previously established tool center point (TCP); determine joint angle deviations by comparing recorded joint angles to expected joint angles; and apply the deviations as joint mastering offsets to update an internal joint configuration or kinematic configuration without using factory mastering data, internal encoder values, or external sensors.

BRIEF DESCRIPTION OF DRAWINGS

The present system is illustrated by way of example and is not limited by the figures of the accompanying drawings, in which like reference numerals indicate similar elements throughout the various views.

DETAILED DESCRIPTION

The following detailed description refers to the accompanying drawings, which form a part of this disclosure and illustration specific embodiments or examples. The described aspects may be combined, other aspects may be utilized, and structural changes may be made without departing from the scope of the present disclosure. The examples provided herein may be practiced as methods, systems, or devices. Accordingly, this detailed description is not to be taken in a limiting sense, and the scope of the present disclosure is defined by the appended claims and their equivalents.

The present disclosure provides methods and systems for establishing the position of a robot's tool center point (TCP) and a user coordinate system using projected laser geometry. In certain embodiments, an operator positions the robot's tool tip at the intersection of two projected laser beams to establish a TCP. This intersection point, along with the axes defined by the paths of the laser beams, is then used to establish a user-defined coordinate system. These physical elements serve as references for both the location of the robot tool tip and for establishing an operational coordinate system for the robot.

The described methods do not require sensors, computer-aided design (CAD) files, numerical control (NC) blocks, or traditional mastering procedures. Instead, the robot may be aligned to a physical, laser-defined reality, which facilitates accurate robot motion regardless of factors such as motor replacement or fixture changes. The accuracy of alignment can be verified by tracking the robot's conformance to the projected laser geometry.

Rather than modifying the internal kinematics of the robot, the disclosed method provides an external, laser-defined geometry that reorients the robot's motion to correspond with the actual physical environment. As a result, the robot operates as if its internal model possesses perfect accuracy, even if its inverse or forward kinematic configuration is not altered.

The techniques described herein may also be employed after robot motor or encoder replacement, providing a repeatable and accurate method to restore mastering without dependence on original equipment manufacturer (OEM) tools or internal kinematic assumptions. This is accomplished by directly teaching the robot both the tool center point and the user-defined coordinate system using laser geometry. There is no need for CAD modeling, offline programming, and prior digital alignment.

Figure 1A:
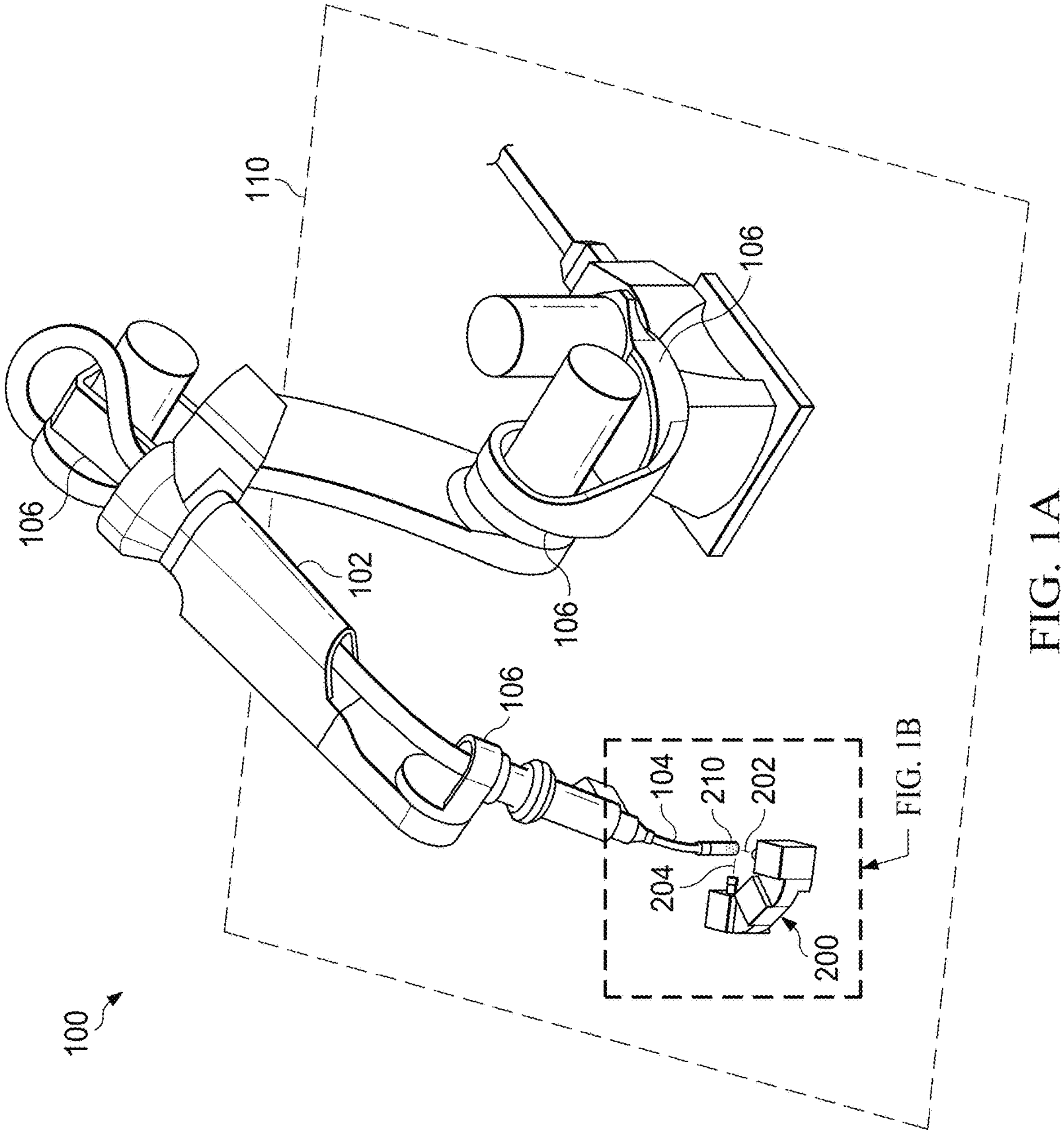
FIG. 1A is a diagram showing an example system for robot calibration, in which a laser-emitting device projects coplanar intersecting laser beams, and the tool tip of a robot is brought into alignment with the intersection point of the laser beams.
Figure 1B:
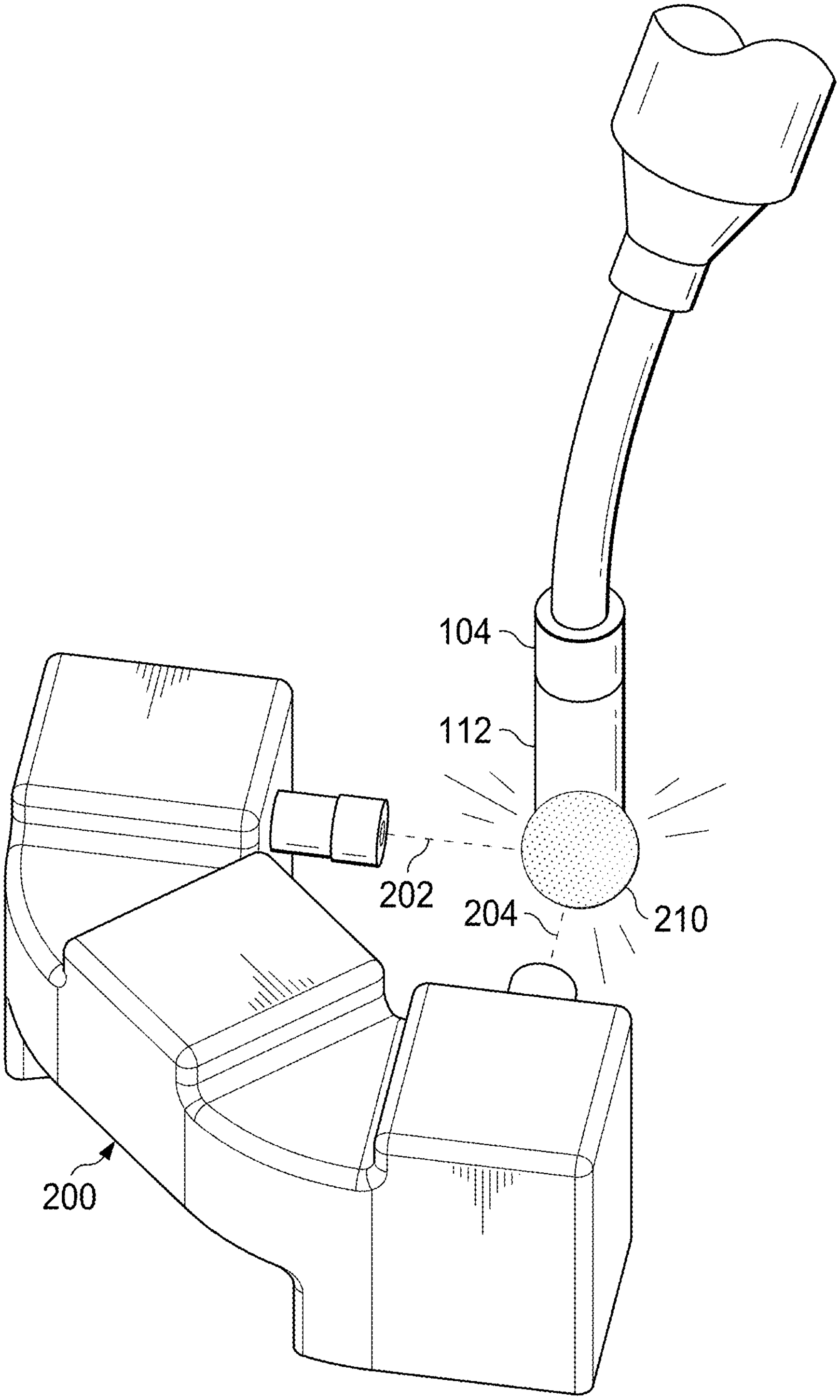
FIG. 1B is an exploded view illustrating the tool tip and laser-emitting device of FIG. 1A, with a visible spot at the tip of the robot tool located at the intersection point of the laser beams.

FIGS. 1A and 1B illustrate an exemplary robot calibration system 100 according to the present disclosure. The system 100 includes a robot 102 and a laser-emitting device 200. A calibrated TCP can be established for the robot 102 by emitting laser beams 202, 204 from the laser-emitting device 200, manually adjusting the robot 102 to align its tool tip 104 with the intersection point 210 of the laser beams 202, 204, and recording a calibration position (such as the angles of the robot's joints 106) in this aligned configuration, as further described herein.

Figure 2A:
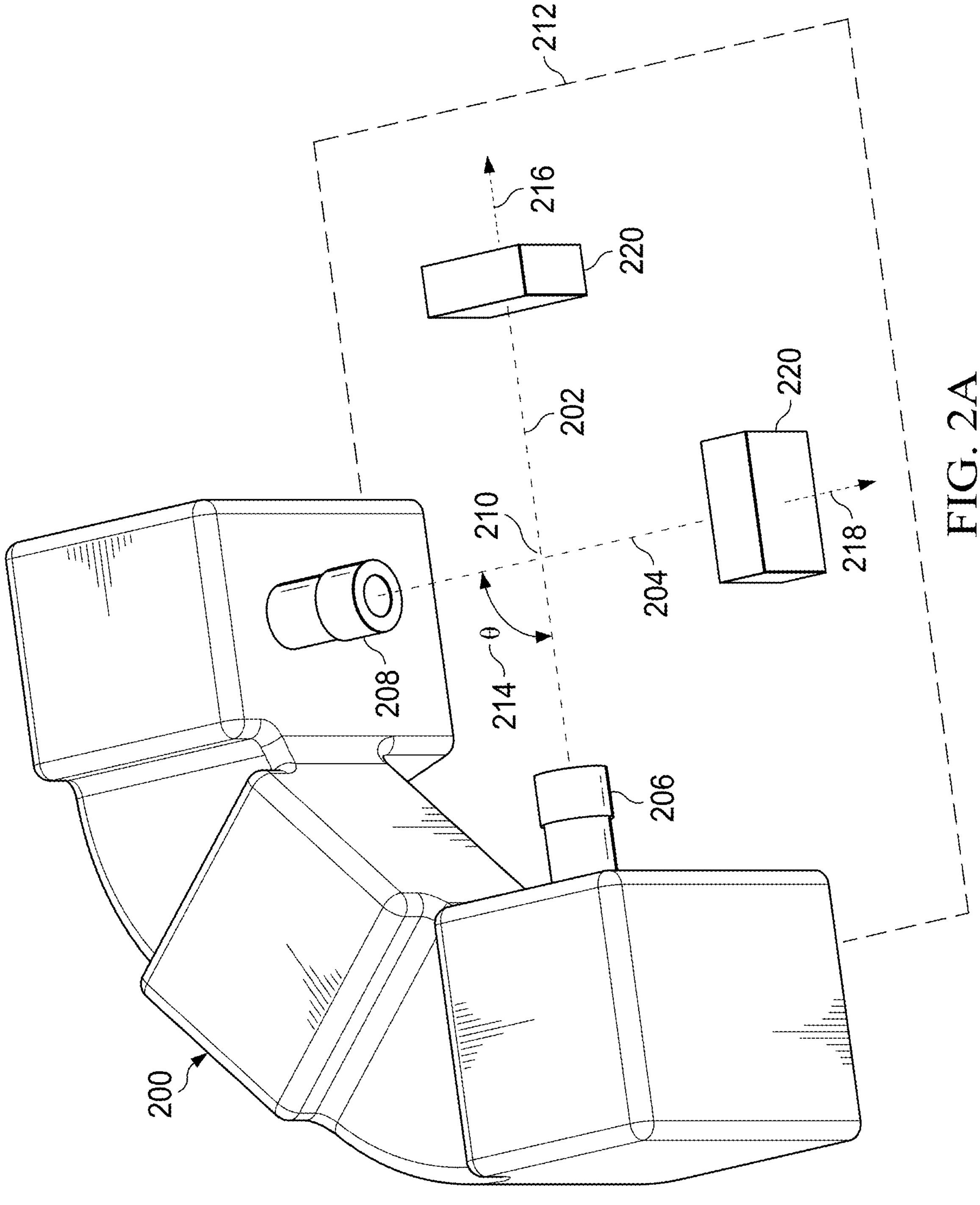
FIG. 2A is a perspective diagram providing additional detail of the laser-emitting device of FIGS. 1A and 1B, showing the two coplanar laser beam-projecting lasers, the emitted laser beams, the angle between the laser beams, the intersection point used to define the TCP, and an optional laser-detection object.

For example, during a calibration operation, the laser-emitting device 200 may emit a first laser beam 202 and a second laser beam 204 (e.g., from corresponding laser beam-projecting lasers as shown in FIG. 2A). The first laser beam 202 intersects and is coplanar with the second laser beam 204. To calibrate the TCP, the robot 102 is manually jogged so that the tool tip 104 is brought into alignment with the intersection point 210 of the first and second laser beams 202, 204, such that the intersection point 210 serves as the TCP for the robot 102. FIG. 1B provides a more detailed view of this intersection point 210. As shown, a visible spot 212 is established on the tool tip 104 at the intersection point 210. The visible spot 212 may be generated by light from the laser beams 202, 204 reflecting off the tool tip 104, or by a photo-response material 212 applied to the tool tip 104.

To enhance visibility, the system may incorporate a photo-responsive material 112, such as a fluorescent, phosphorescent, photo-reactive, or other wavelength-sensitive surface, which becomes visibly activated when struck by the laser beams 202, 204. Visibility may be further improved through the use of wavelength-filtering eyewear, allowing operators to distinguish the laser-defined geometry without electronic sensing. In some embodiments, the photo-responsive material 112 may be placed on the tool tip 104, either permanently or temporarily during calibration or mastering of the robot 102. The photo-responsive material 112 may emit light, change color, and/or become visible when struck by one or both of the first and the second laser beams 202, 204. Examples of suitable photo-responsive material 112 include fluorescent tape or paint, reflective coatings (such as those made with microprismatic or glass bead technology), photochromic films or coatings that change color upon irradiation, thermochromic paints or tapes that change color when heated by the laser beams, or phosphorescent materials (such as zinc sulfide doped with copper or strontium aluminate-based pigments) that glow after exposure to the laser beams. The photo-responsive material 112 may be excited or activated by the laser beams 202 and 204 to provide a more readily visible indication of whether the tool tip 104 is aligned with the intersection point 210. In some embodiments, the laser beams 202, 204 are in a non-visible part of the spectrum, and the photo-responsive material 112 enables visualization of the intersection point 210 only when the tool tip 104, bearing the photo-responsive material 112, is properly aligned. An alternative approach to determining alignment of the tool tip 104 and the intersection point 210 (or, more generally, with at least one laser beam 202, 204) is also described below with reference to FIGS. 2B and 2C.

In the example illustrated in FIGS. 1A and 1B, the robot 102 is equipped with a tool tip 104, also referred to as an end effector, which is used to perform a variety of robotic tasks. These tasks may include, but are not limited to, welding a workpiece with a weld gun, manipulating a workpiece with a gripper, dispensing materials such as adhesives or sealants, performing cutting operations with a laser or plasma cutter, or conducting inspections using a vision system. Accordingly, the tool tip 104 may be the functional end portion of the robot that directly interacts with the workpiece or environment. Examples of tool tips include a welding gun outlet, the operable part of a manipulator tool (such as the jaws or fingers of a gripper), the dispensing end of an adhesive or sealant applicator, the output coupler of a cutting laser, the tip of a plasma cutting torch, a camera lens, a sensor, or similar components. The robot's joints 106 are responsible for accurately positioning the tool tip 104 to perform these diverse operations. The joints 106 may be moved to various positions or angles to achieve a desired pose or orientation, thereby placing the tool tip 104 at the required location within the workplace, as described in further detail below.

The robot 102 operates within a workspace 110, which may also be referred to as a robotic work cell or robot cell. The workspace 110 is a defined physical area in which the robot 102 functions, and typically includes the robot 102 itself, its tool tip 104, and any associated fixtures, workpieces, equipment, and safety barriers. This workspace 110 serves as the environment where the robot 102 performs its assigned tasks and where calibration activities are conducted. When the robot 102 is relocated from one workspace to another, a new calibration may be required to ensure continued accuracy. However, as discussed in greater detail below, certain embodiments allow for the use of a logical transform to more efficiently update the robot's programming for the workspace 110 changes, such as when different fixtures are moved into the workspace 110 to perform different tasks or work on a different workpiece. This logical transform is derived by comparing user coordinate systems from before and after the change, which allows for the reuse of existing robot programs without the need to manually recalibrate or "touch up" all the points in the altered workspace.

As illustrated in FIG. 1A, the robot 102 includes one or more joints 106. These joints are articulated components that provide multiple degrees of freedom, allowing the tool tip 104 to be precisely positioned and oriented precisely within the robot's workspace 110. The joints 106 may include rotary (revolute) actuators and/or linear (prismatic) actuators, each contributing to the overall flexibility and reach of the robot's arm or other moving parts. The movement of the joints 106 is controlled by a control system 108, which receives input commands from various sources, such as a programmed sequence, an operator interface (for example, the user control interface 622 shown in FIG. 6, which is used for manually jogging the tool tip 104), or sensor feedback. The control system 108 translates these commands into coordinated motions of the joints 106. For reliable operation, the control system 108 requires a properly calibrated TCP and coordinate system to ensure that the tool tip 104 reaches the intended position and orientation within the workspace 110. Internal reference positions for each joint 106 may be stored by the control system 108, enabling accurate interpretation of joint angles for precise movement of the tool tip 104. These internal references can be validated and adjusted using the mastering methods described in this disclosure. Collectively, the calibration and mastering methods described herein enable the robot to execute tasks such as welding, gripping, dispensing, and inspection with high accuracy, as directed by the control system 108. Further details regarding the control system 108 are provided below in connection with FIG. 6.

FIG. 2A provides a more detailed view of the laser-emitting device 200 used in the system of FIGS. 1A and 1B. The laser-emitting device 200 includes a first laser beam-projecting laser 206, which emits a first laser beam 202 in a first direction 216 when activated, and a second laser beam-projecting laser 208, which emits a second laser beam 204 in a second direction 218 when activated. The two laser beam-projecting lasers 206, 208 are oriented relative to each other such that the laser beams 202 and 204 are coplanar—that is, both laser beams 202, 204 are emitted along the same plane 212, as shown in FIG. 2A. The angle between the laser beam-projecting lasers 206, 208 is generally predefined to achieve a known relative angle 214 between the first and second laser beams 202, 204 (i.e., between the first and second directions 216, 218). In some embodiments, the angle 214 is 90 degrees, resulting in orthogonal laser beams. In other embodiments, the angle 214 may be set to another known value, such that the intersection point 210, which establishes the TCP for the robot 102, is known relative to the position of the laser-emitting device 200. For example, the angle 214 may be in a range from 20 degrees to 160 degrees. In some embodiments, the angle 214 is between 20 degrees and 80 degrees, as a smaller angle 214 may allow the laser-emitting device 200 to have a smaller footprint with laser beam-projecting lasers 206, 208 positioned relatively close to one another. In some embodiments, the angle 214 is in a range from about 40 to 90 degrees.

As described herein, the laser-emitting device 200 is used to calibrate the work path of the robot tool tip 104 by defining the TCP defined at the intersection point 210 of the laser beams 202, 204. Prior to calibration, the TCP may correspond to a different point in the workspace; after calibration, the TCP is set to be substantially the same as the intersection point 210 of the two laser beams 202, 204. In this context, the phrase "substantially the same" means that the TCP is located within a predetermined tolerance or allowable deviation from the intersection point 210, as defined by the requirements of the specific application. For example, the tolerance may be within a fraction of a millimeter or another suitable unit of measurement, such that any difference between the calibrated TCP and the intersection point 210 does not materially affect the robot's intended operation or accuracy. The intersection point 210 is defined in three dimensions (X, Y, and Z) and may also be referenced relative to the rotational axes of the laser beam-projecting lasers 206, 208: $R_x$ (pitch), $R_y$ (yaw), and $R_z$ (roll).

The laser beam-projecting lasers 206, 208 may be of any type suitable for the intended application, including but not limited to diode lasers, solid-state lasers, or gas lasers. The emitted laser light may have any appropriate intensity and frequency, including wavelengths in the visible or non-visible (such as infrared or ultraviolet) portions of the spectrum, depending on the visibility and safety requirements of the workspace 110. Additionally, the laser beam-projecting lasers 206, 208 may be equipped with lenses and/or optical filters to condition or collimate the laser beams, thereby reducing beam divergence and improving the clarity and precision of the intersection point 210. Such conditioning can enhance the visibility of the laser beams 202, 204 and support more accurate calibration and mastering. For example, the laser beam-projecting lasers 206, 208 may be of the type described in U.S. Pat. Nos. 5,689,330 or 6,314,650, both of which are incorporated herein by reference. However, any laser system capable of producing a well-defined beam suitable for establishing a precise intersection point 210 may be used.

As previously described, in some embodiments, the presence and alignment of the tool tip 104 may be detected based on the interaction between the laser beams 202, 204 and the tool tip 104 itself or a photo-responsive material 112 applied to the tool tip 104. In other embodiments, as illustrated in FIG. 2A, one or more separate objects 220 may be positioned so that the laser beams 202, 204 are directed toward these objects 220, and a corresponding laser spot is projected onto each object 220. When the tool tip 104 is aligned with a laser beam 202, 204, the spot on the object 220 may disappear or decrease in size or intensity. The same object 220 may be repositioned to detect alignment with both laser beams 202, 204, or two separate objects may be used, as shown in FIG. 2A.

Figure 2B:
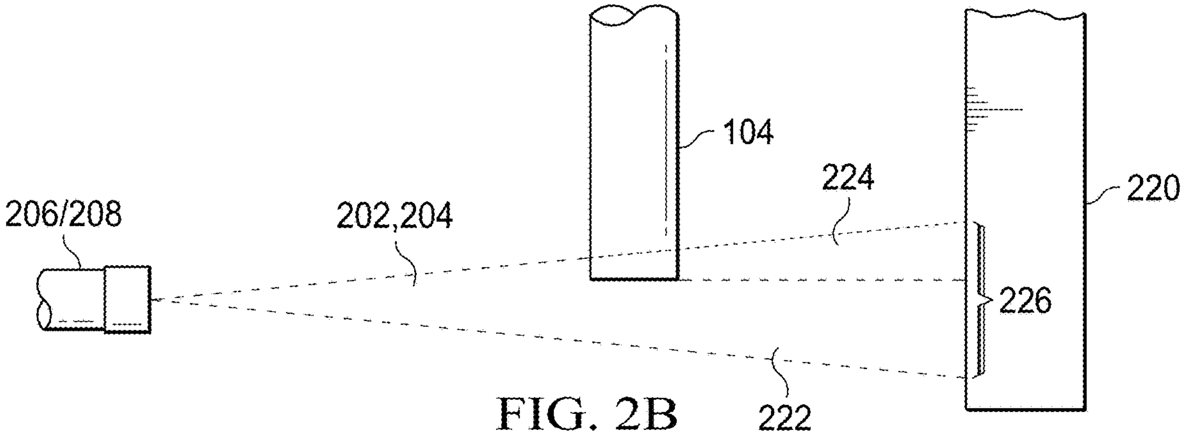
FIGS. 2B and 2C are diagrams illustrating the optional laser-detection object of FIG. 2A during operation, showing how the alignment of the tool tip with a laser beam is a determined from a side view (FIG. 2B) and a front view (FIG. 2C).
Figure 2C:
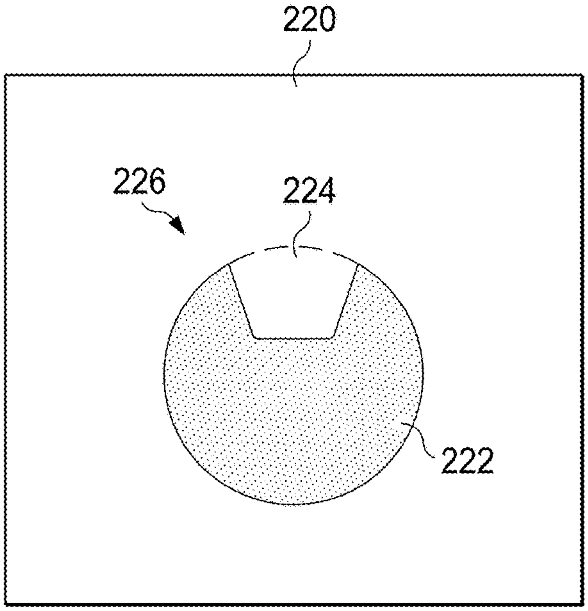

FIG. 2B illustrates a side view of laser beams 202, 204 being directed toward an object 220, while FIG. 2C provides a front view of the object 220. These figures illustrate a configuration in which the tool tip 104 is at least partially aligned with the laser beam 202, 204, such that a full laser spot 226—visible when the tool tip 104 does not obstruct the laser beam 202, 204—is decreased in size due to the tool tip 104 blocking part of the beam's path, resulting in a spot 222 with a region 224 obstructed. The object 220 may be reflective or may be coated with the photo-responsive material 112 described above. As shown in FIGS. 2B and 2C, when the tool tip 104 is aligned with a laser beam 202, 204, it prevents at least a portion of the beam from reaching the object 220, so that the original full laser spot 206 projected on the object 220 is decreased in size and/or intensity, forming spot 222 with region 224 blocked by the tool tip 104. To confirm alignment, a threshold portion (for example 10% up to 100%) of the original full spot 226 may need to be blocked by the tool tip 104. The object 220 may be used for aligning the tool tip 104 to the intersection point of laser beams 202, 204 (for TCP calibration and mastering) and/or for establishing X and Y axes of the user coordinate system, as described with respect to FIGS. 4A and 4B below.

Figure 3:
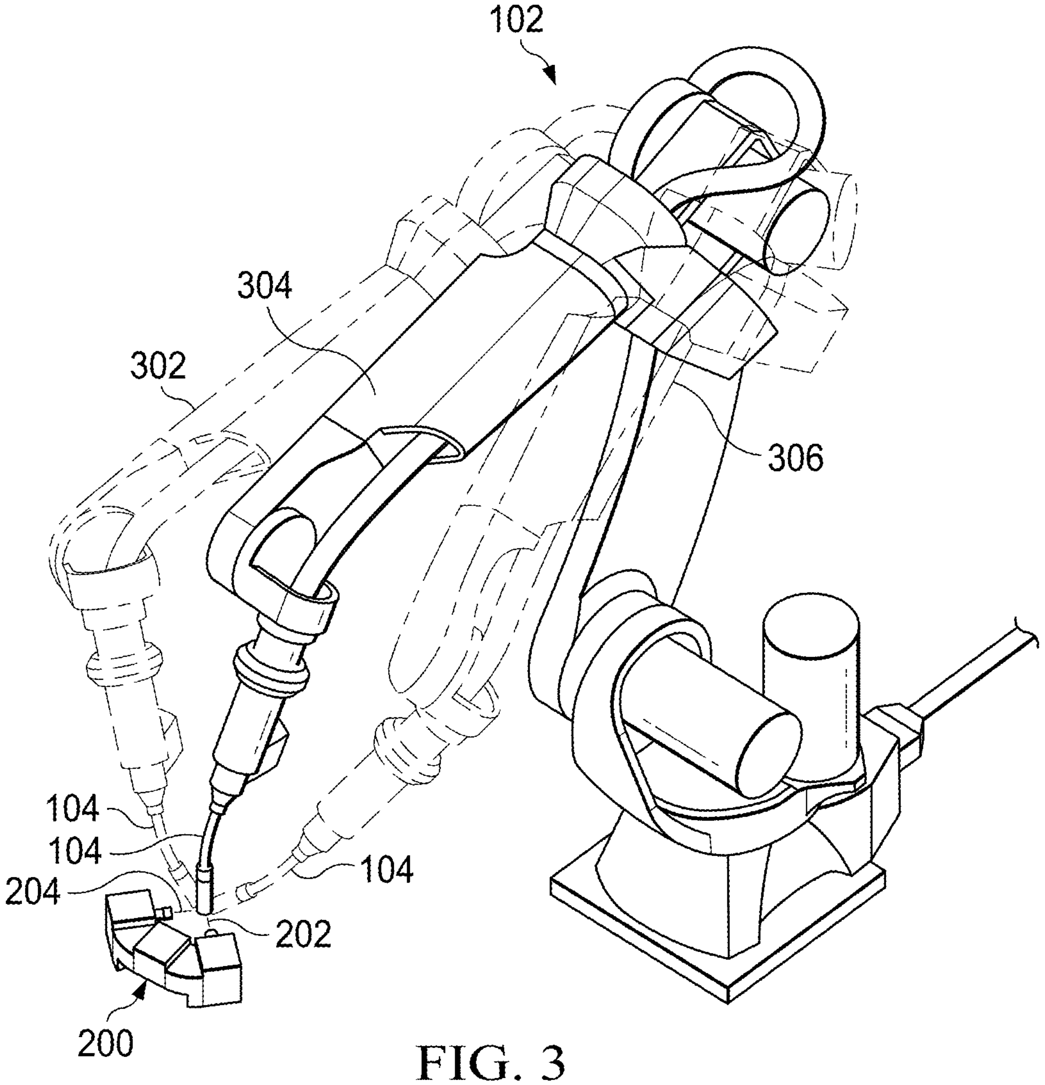
FIG. 3 is a diagram depicting the process of establishing a TCP at the intersection point of the laser beams by aligning the robot tool tip with the intersection point, with the robot positioned in different orientations or poses.

FIG. 3 depicts the system 100 during an example process for teaching the robot 102 the TCP at multiple orientations, where the tool tip 104 is aligned with the intersection point 210. In this operation, the laser-emitting device 200 is placed within the robot's workspace 110. The laser-emitting device 200 may be mounted to a fixture or otherwise positioned independently in the workspace 110. Once in place, the laser-emitting device 200 is activated to emit the first and second laser beams 202, 204, which intersect at intersection point 210. This intersection point serves as a visible spatial target for calibrating the TCP and acts as a directional reference geometry (see also FIGS. 4A-4B and related discussion).

To calibrate the TCP at the intersection point 210, the robot 102 is manually jogged so that the tool tip 104 is brought into alignment with the intersection point 210 of the first and second laser beams 202, 204. For example, an operator may use controls such as buttons, a joystick, or a touchscreen on a user control interface connected to the control system 108 (see FIG. 6) to move the robot 102 to move until the tool tip 104 is visually aligned with the intersection point 210.

After the robot 102 is manually jogged to align the tool tip 104 with the intersection point 210, the operator instructs the control system 108 to record the configuration of the robot 102 as a "teach point" for the TCP corresponding at intersection point 210. For example, the operator may select a button, key, or other input on the user control interface to record the current configuration of joints 106 of the robot 102 (such as the joint angles or another metric of robot position/pose) as corresponding to the TCP. This teaching process can be repeated at multiple orientations 302, 304, 306 of the arm of the robot 102, as illustrated in FIG. 3. The orientations 302, 304, 306 shown in FIG. 3 correspond to the pose of the robot arm of the robot 102 with the joints (see joints 106 of FIG. 1A) having different joint configurations but with the tool tip 302 still at intersection point 210. For example, the robot 102 may be manually positioned via the user control interface in a first orientation 302 in which the tool tip 104 is aligned with the intersection point, and a corresponding set of joint angles may be recorded for this orientation 302. This process may be repeated to record joint angles for a second orientation 304 and third orientation 306, such that the different joint angles/configuration of these orientations can be recorded as corresponding to the TCP. In this manner, the intersection point 210 of the first and second laser beams 202, 204 defines the TCP for the robot 102 without the need for sensors, digital models, digital feedback, or reference to internal robot mastering.

Once the TCP is established at the intersection point 210, the robot 102 can reliably return the tool tip 104 to this location, regardless of the orientation of the arm of the robot 102. Additional operations may then be performed to establish a calibrated user coordinate system for the robot 102. The user coordinate system provides a spatial reference framework that is aligned with the laser-defined TCP (for example, using the TCP as its origin). This coordinate system allows an operator to specify and control robot movements in terms that are meaningful and intuitive for the specific application or workspace 110. By calibrating the user coordinate system relative to the intersection point 210 of the laser beams 202, 204, the robot 102 can execute tasks with respect to user-defined axes and origin (i.e., the TCP), enabling precise and repeatable operations without relying on internal robot coordinates or external digital models.

Figure 4A:
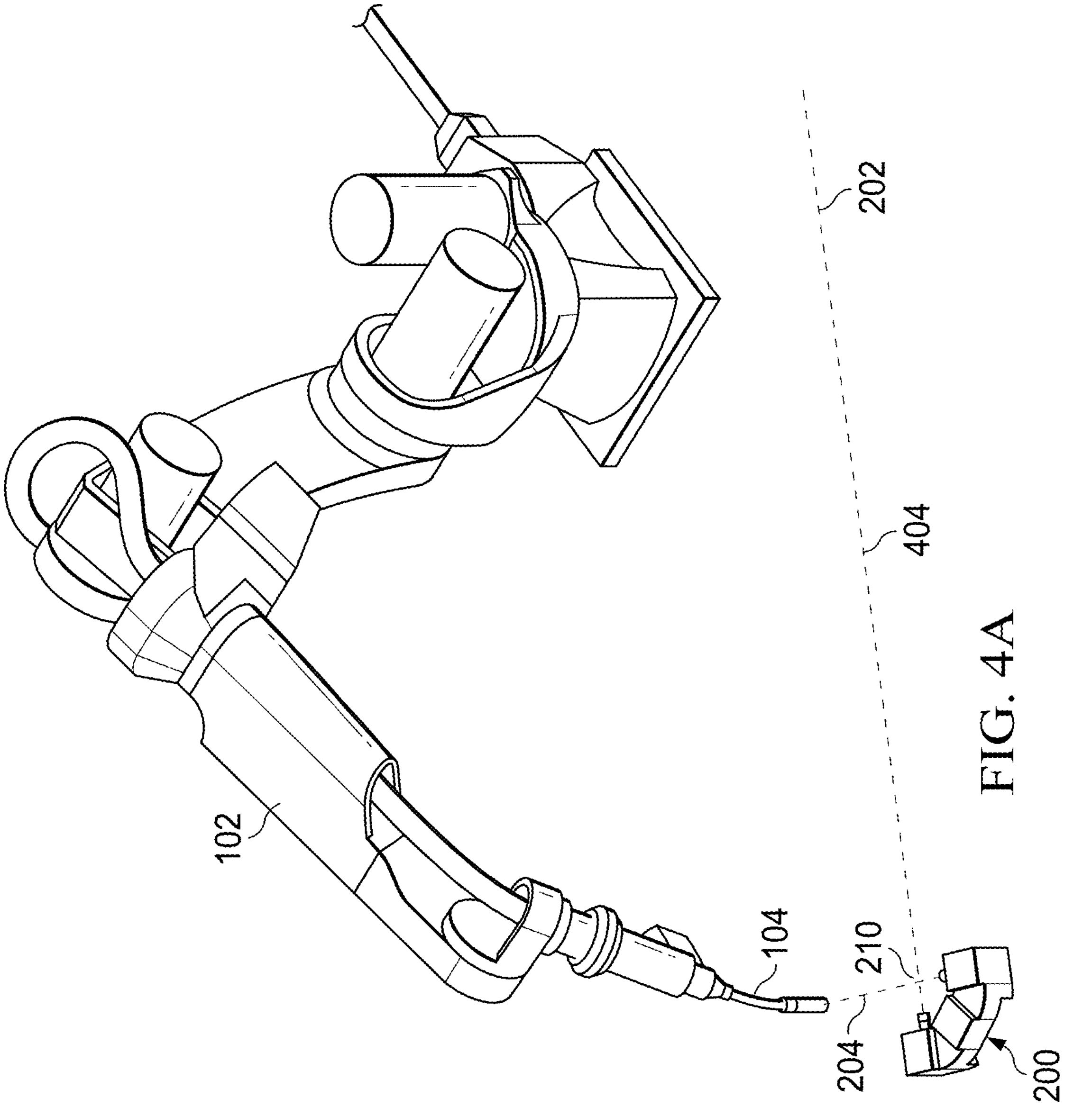
FIG. 4A is a diagram showing the laser-emitting device of FIG. 2A with the robot tool tip positioned along a beam path defining a Y elongator, illustrating the process of teaching the user coordinate system.
Figure 4B:
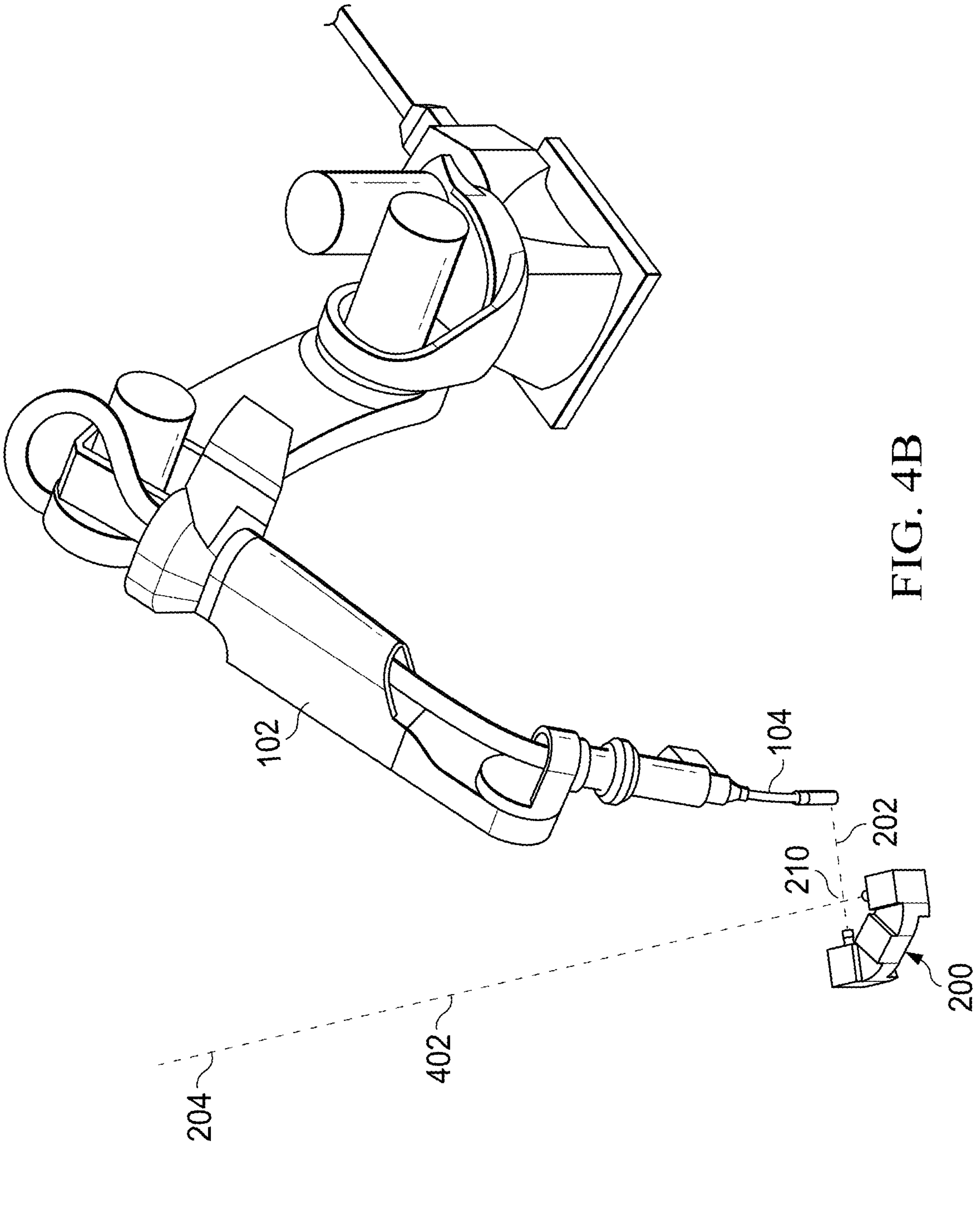
FIG. 4B is a diagram showing the laser-emitting device of FIG. 2A with the robot tool tip positioned along a beam path defining an X elongator, further illustrating the process of teaching the user coordinate system.

FIGS. 4A and 4B illustrate the process of calibrating movements along different axes (for example, the Y axis in FIG. 4A and the X axis in FIG. 4B) of the user coordinate system by calibrating positions of the tool tip along the lengths of paths 402, 404 defined by the laser beams 202, 204. FIG. 4A shows the process of calibrating the Y axis of the user coordinate system by using the second laser beam 204 as a Y elongator. In this operation, the tool tip 104 is moved along a laser-defined linear path 402 that corresponds to the direction in which the second laser beam 204 is emitted (i.e., direction 218 of FIG. 2A). As the tool tip traverses this Y elongator path 402, the operator confirms alignment of the tool tip 104 with the laser beam 204, for example by visually observing a photo-responsive material 112 or using object 220 as illustrated in FIGS. 2A-2C. If misalignment is observed, the operator uses the user control interface to manually jog the robot 102 to reposition the tool tip 104 into alignment with the second laser beam 204. For instance, if the tool tip 104 is not aligned with the second laser beam 204 at a given position along the Y elongator path 402, the operator jogs the robot 102 to achieve alignment and then records the joint angles for the aligned position. Once alignment is achieved, the operator records, in the control system's 108 memory, the joint angles or other configuration data for various positions along the length of the linear path 402. These recorded joint angles are then used to define the Y axis of the user coordinate system.

FIG. 4B shows a similar process for defining the X axis of the user coordinate system by using the first laser beam 202 as an X elongator. In this operation, the tool tip 104 is moved along a laser-defined linear path 404 that corresponds to the direction in which the first laser beam 202 is emitted (i.e., direction 216 of FIG. 2A). As the tool tip traverses this X elongator path 404, the operator confirms alignment with the laser beam 202, again by visually observing a photo-responsive material 112 or using object 220 illustrated in FIGS. 2A-2C. If misalignment is observed, the operator uses the user control interface to manually jog the robot 102 to reposition the tool tip 104 into alignment with the first laser beam 202 and records the joint angles for the aligned position. Once the tool tip 104 is aligned to the laser beam 202, the operator records, in the control system's 108 memory, the joint angles or configuration data for various positions along the linear path 404. These recorded joint angles are then used to define the X axis of the user coordinate system.

Importantly, the establishment of this user coordinate system relies solely on the physical geometry defined by the intersection and orientation of the first and second laser beams 202, 204, without the need for additional sensors, CAD models, digital feedback, or reference to the robot's internal mastering. This approach provides a straightforward and sensor-less method for defining user-specific coordinate axes, ensuring that the robot's movements are precisely aligned with the physical workspace 110 as determined by the laser-defined paths 402, 404. Unlike previous technologies, which adjusted robot motion based on CAD-derived environments or attempted to align robot movements to offline programs, the approach described herein teaches both the TCP and the user coordinate system directly from the physical laser-defined geometry. In this way, the robot's unaltered programming conforms to the real-world environment, rather than requiring internal adjustments, digital correction, or assumed fixture locations. In other words, the robot 102 is made to conform to physical reality as defined by the geometry of the laser beams 202, 204 emitted by the laser-emitting device 200, rather than being painstakingly fitted to a theoretical or digital abstraction.

While described as not requiring CAD models, it should be noted that in some embodiments, the laser-emitting device 200 is placed in a predefined position such that the intersection point 210 corresponds to the UFrame origin in a CAD model. This approach does not rely on changes to the CAD files, downloaded OLPs, NC data, or sensor alignment to teach the TCP or UFrame. Instead, the geometry is defined, as described above, directly from the physical intersection point 210 and the x and y axes of the laser beams 202, 204. As such, even though the processes can be performed independently of CAD-derived environments, the disclosed methods can also operate in CAD-derived OLP environments when appropriate or desired. In such cases, the TCP and UFrame are calibrated sensorlessly and defined from the physical space without adjusting the underlying CAD or using digital alignment routines.

While the laser beams 202, 204 are shown as being orthogonal in the examples of FIGS. 4A and 4B, such that the calibration points align with the X and Y coordinates of a Cartesian coordinate system, this disclosure also contemplates that the laser beams 202, 204 may be set at a different known orientation or angle relative to each other. In such cases, the calibrated points along the linear paths 402, 404 can still be used to establish the user coordinate system by applying an appropriate geometric conversion based on the known angle or relative orientation of the laser beams 202, 204 when they are not orthogonal.

Two example calibration workflows are described in the following. In a first example mode, the robot 102 is calibrated in a CAD-based offline programming mode. In this mode, the robot 102 operates in a coordinate system defined by a CAD model. The laser-emitting device 200 is placed in the exact physical location that corresponds to the UFrame origin of the CAD model. TCP and UFrame are then taught directly from the laser beams 202, 204 at that location, as described above. This ensures that all motion programmed offline matches the real-world geometry without requiring any CAD files, digital models, or sensor alignment at runtime.

In a second example mode, the robot 102 is calibrated in a Program Reuse/Relocation Mode. In this mode, the robot 102 already has a working program. Prior to relocation or teardown, the laser-emitting device 200 is placed anywhere convenient within the workspace 110, and a user coordinate system is taught from its physical geometry, as described above. After the robot 102 is moved, the laser emitting device 200 is placed in the same relative position (e.g., on the same baseplate or fixture location), and the same laser-based user coordinate system is re-taught. This allows the robot 102 to reuse its original program via a spatial transform. No CAD, sensors, or re-teaching are required.

These two example workflows demonstrate that the methods of this disclosure are compatible with CAD-aligned accuracy when required, while also supporting sensor-less, repeatable robot relocation when CAD is unavailable or unnecessary. In both scenarios, the robot's geometry is efficiently and accurately aligned to the physical laser-defined space rather than to assumed or pre-programmed digital data.

Once the TCP and user coordinate system are established using the laser-defined geometry, the collected calibration data, and more specifically, the sets of joint angles recorded at these known physical positions (for example, the intersection point 210 and points along the X and Y elongator paths 404, 402), are used to determine or refine the robot's kinematic model. This method does not require pre-existing knowledge of the robot's full Denavit-Hartenberg (DH) parameters. Instead, the control system 108 can analyze the joint-angle feedback from these known spatial positions to solve for or refine key kinematic parameters, such as link lengths, joint offsets (mastering values), and axis orientations, on a post-hoc basis. This process can effectively replace traditional mastering procedures, which typically rely on aligning a robot to OEM-supplied witness marks or assumed digital models. By calibrating directly against a physical, laser-defined geometry, the systems and methods of this disclosure help ensure the resulting kinematic model accurately reflects the robot's real-world structure, serving as a precise basis for all subsequent motion planning and execution.

In some embodiments, when the workspace 110 is changed (e.g., by changing fixtures in the workspace 110), the full calibration process can be avoided. Instead, a smaller subset of data may be collected to compute a logical transform that maps the original user coordinate system to a new user coordinate system in the altered workspace. This process begins by manually jogging the robot 102 to different laser-defined points in the workspace 110. For instance, the robot 102 may specifically be jogged to place the tool tip 104 at its origin (e.g., the already established TCP), a point (or points) along its X-axis, and a point (or points) along its Y-axis. The robot's joint angles are recorded at each of these three (or more) positions. Using these data points, the control system 108 calculates the frame-to-frame transform, which provides the translation and rotation required to map the original user coordinate system of the original workspace layout to that of the new one. This transform, which can be represented as a 4×4 homogeneous transformation matrix, mathematically relates the origin and orientation of the old frame to the new one. By applying this transform to all points in an existing program, the program can be executed accurately in the altered workspace, preserving point accuracy without requiring CAD models, external sensors, or re-teaching the TCP. This approach ensures all subsequent robot movements are correctly calculated with respect to the altered physical environment, maintaining precise and repeatable operation.

To correct for robot misalignment resulting from joint mastering drift or motor replacement, the robot 102 may be positioned at one or more known spatial locations, as defined by the laser-emitting device 200 described in this disclosure. At each of these locations, the expected pose and positioning of the robot 102—calculated from its internal kinematic model—can be compared to the actual robot pose and positioning as determined from forward kinematics. Any deviation in orientation or position is used to compute joint angle deviations ($\Delta\theta$), as discussed in greater detail below. These deviations can then be mapped back to joint offsets using inverse kinematics or a Jacobian-based pseudoinverse solution. The resulting values are applied as new mastering offsets, thereby remastering the robot 102 and restoring its positional accuracy.

In some embodiments, joint angle deviations ($\Delta\theta$) are determined at multiple known spatial positions within the user-defined coordinate system. To minimize overall kinematic error during remastering, a Jacobian-based least-squares operation may be performed. This operation uses the set of recorded joint angles and their corresponding spatial deviations to solve for the optimal set of joint mastering offsets or kinematic parameters that best fit all sampled positions. By averaging or minimizing the deviations across all positions using the least-squares approach, the updated internal kinematic configuration can more accurately reflect the true geometry of the robot, thereby improving the precision and repeatability of subsequent operations.

In practical applications, it may not be possible to obtain the exact tool orientation (e.g., $R_x$, $R_y$, and $R_z$) at each known spatial position, especially in systems that operate independently of CAD or digital models. In such cases, the methods and systems described herein permit the use of consistent, known orientations (such as fixed angular values) across all known points. As long as the same orientation is achieved both when solving the inverse kinematics and during the actual teaching process, accurate joint angle deviations can still be computed and averaged. This enables reliable mastering correction without requiring precise orientation data for each position.

FIGS. 5A-5D illustrate a mastering system 500 used for remastering a robot 102. The mastering system 500 may include a mastering device 502, which serves as a stable and physically repeatable reference structure within the robot's workspace 110. The example mastering device 502 includes a base 504 and risers 506*a,b*, which together support a laser-emitting device 200 at known, fixed locations. However, in other embodiments, the mastering device 502 may have a different structure or may be formed from existing structures, such as brackets, mounting points, and/or sections of existing production fixtures, in the workspace 110. For example, rather than attaching the laser-emitting device 200 to risers 506*a,b*, remastering may be performed by assigning a fixture (or fixtures) as a mastering position (or positions) in the workspace 110. The laser-emitting device 200 may then be moved to this position (or positions) to perform the remastering process described in this disclosure rather than using risers 506*a,b*. In some embodiments, the mastering device 502 maintains a fixed spatial relationship with the robot 102, ensuring that its position is identical during initial factory setup and any subsequent field mastering recovery, such as after a motor change. In other embodiments, including those in which a separate mastering device 502 is not used, initial mastered joint angle data is determined at known positions in the workspace 110, whether relative to the risers 506*a,b* or predefined mastering positions on fixtures in the workspace 110. Regardless of the embodiment, this physical repeatability provided by the mastering device 502 or the pre-established mastering position(s) in the workspace 110 eliminates the need for ongoing reliance on CAD models or digital alignment for remastering. While CAD models may be used for initial verification of the robot's geometry and factory mastering of the robot 102, the remastering process itself is based on the real-world geometric consistency of the setup.

The mastering device 502 provides a repeatable structure within the robot workspace 110 for positioning the laser-emitting device 200. In some embodiments, such as for embodiments in which the mastering device 502 is used during initial factory mastering, the mastering device 502 may be a purpose-built fixture, like a laser block with risers 506*a,b*, optionally registered to a CAD model. Alternatively, for remastering (also referred to as "mastering recovery"), the mastering device 502 may be any convenient and repeatable physical feature in the workspace, such as a bracket, a mounting point, or a corner of an existing production fixture, as described above. For mastering recovery, with the robot 102 correctly mastered, its joint angles are recorded at one or more poses aligned to a known feature on the mastering device 502 or other predefined mastering position(s) in the workspace 110. If a motor is later replaced or some other change prompts mastering recovery, the laser-emitting device 200 is returned to the same mastering position(s) and the robot 102 is jogged to visually realign its tool tip 104 to the intersection point of the laser beams 202, 204. The new joint angles at these positions are then compared to the previously recorded joint angles at these predefined mastering positions to compute joint angle offsets ($\Delta\theta_i$) for mastering recovery. These offsets are used to remaster the robot 102 by updating the internal joint configuration of the robot 102 and/or its internal kinematic configuration. This recovery method relies on physical consistency of the mastering positions, as provided by the mastering device 502 or use of other predefined positions in the workspace 110, rather than digital models, precise orientation data, or sensors. When used, the mastering device 502 may include features such as dents, grooves, connectors, or magnets to ensure consistent placement of the laser-emitting device 200.

Figure 5A:
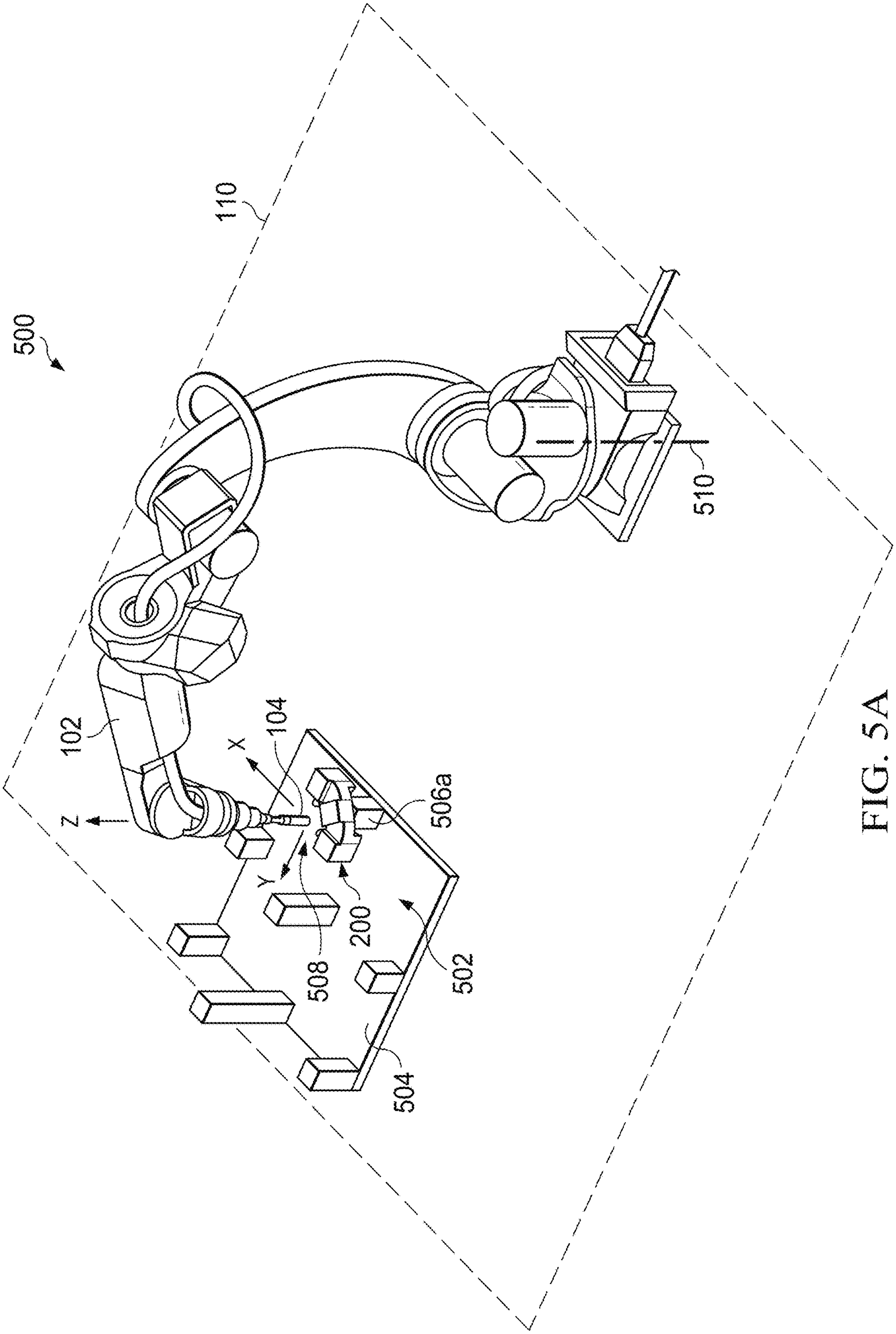
FIG. 5A is a diagram illustrating the use of a mastering system for mastering a robot, in accordance with embodiments of the disclosure.

In FIG. 5A, the mastering system 500 is shown positioned within the robot workspace 110, with a first riser 506*a* supporting the laser-emitting device 200. The robot 102 is depicted in an initial, unmastered state, with the tool tip 104 manually positioned to align with the intersection point of the laser beams emitted by the laser-emitting device (as in the arrangement of FIG. 1A). Before mastering the robot 102, the operator has already established a user coordinate system 508, illustrated here by XYZ coordinates in the workspace 110. The robot 102 has a separate XYZ axis 510.

Figure 5B:
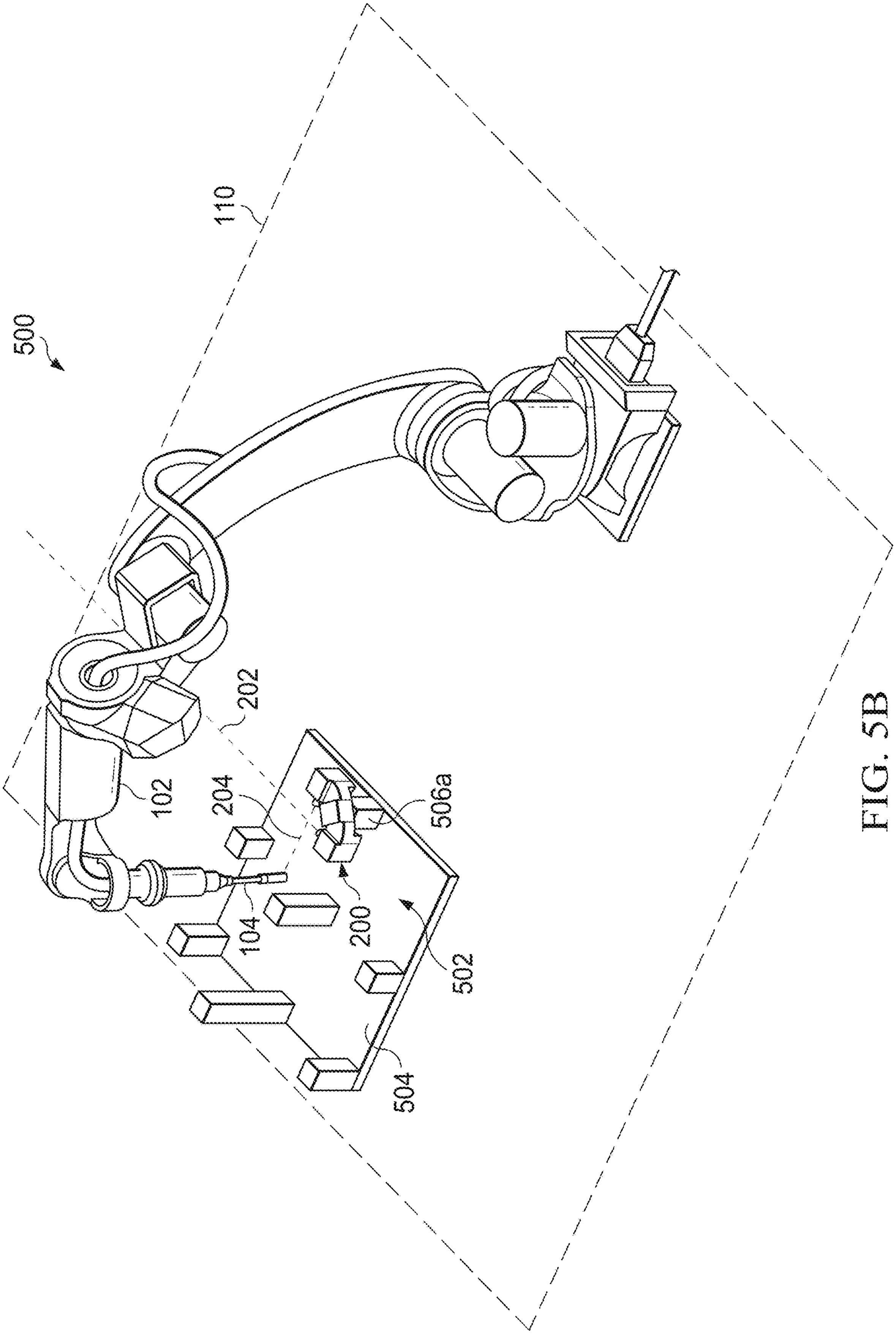
FIG. 5B is a diagram illustrating the use of the mastering system for mastering a robot, with the robot tool tip positioned along a beam path defining a Y elongator to set a datum by repeating the process for defining the user coordinate system, in accordance with embodiments of the disclosure.

FIG. 5B illustrates the process of positioning the tool tip 104 along the Y-elongator to define the Y axis of the user coordinate system 508, with the laser-emitting device 200 affixed to the first riser 506*a* and activated to emit laser beams 202, 204. This process, similar to that described with respect to FIG. 4A, establishes the directional geometry of the robot 102 along the Y axis.

Figure 5C:
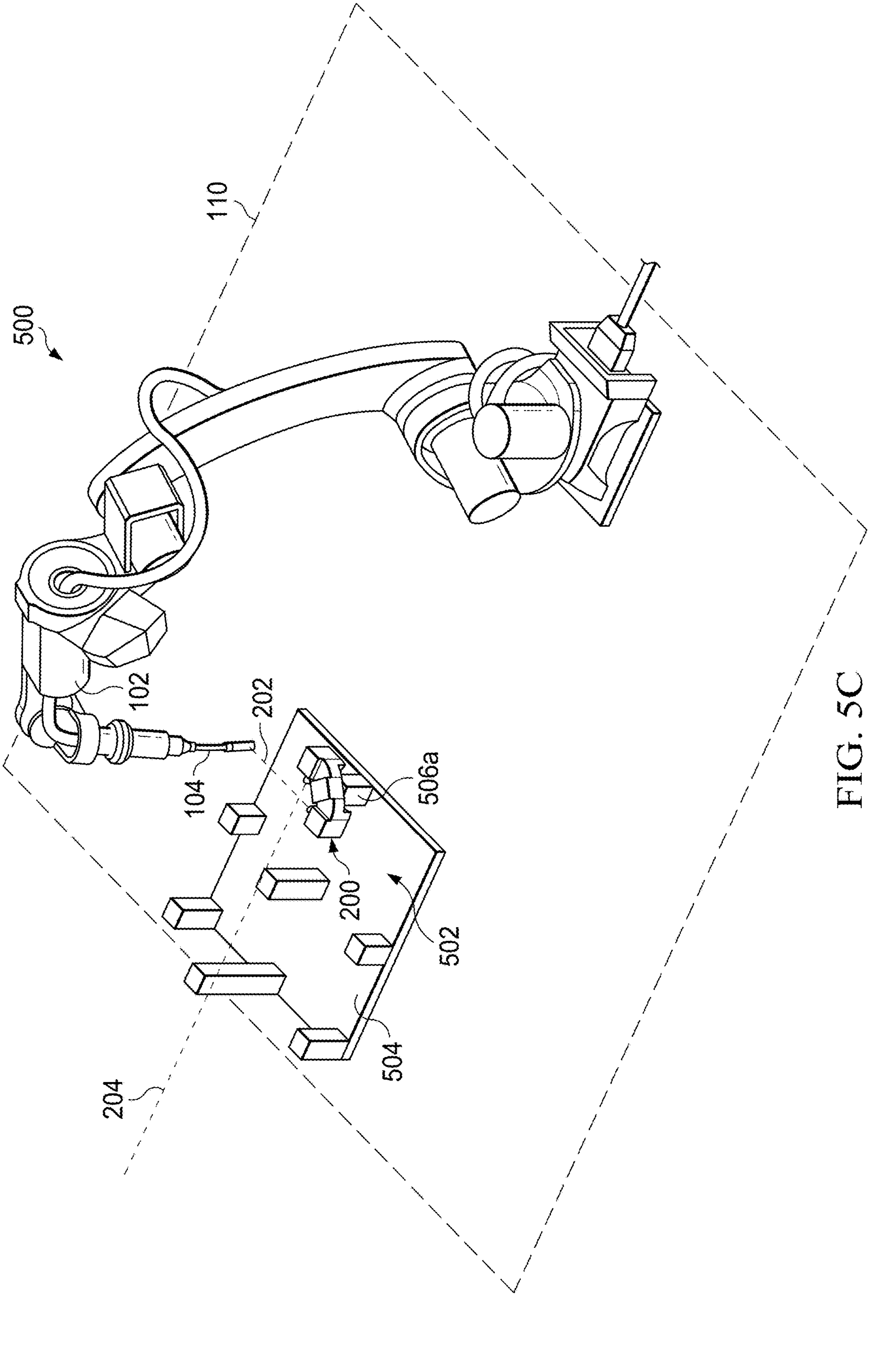
FIG. 5C is a diagram illustrating the use of the mastering system for mastering a robot, with the robot tool tip positioned along a beam path defining a Y elongator to set a datum by repeating the process for defining the user coordinate system, in accordance with embodiments of the disclosure.

Similarly, FIG. 5C illustrates the process of positioning the tool tip 104 along the X-elongator to define the X axis of the user coordinate system 508, with the laser-emitting device 200 affixed to the first riser 506*a* and activated to emit laser beams 202, 204. This process, as described with respect to FIG. 4B, establishes the directional geometry of the robot 102 along the X axis.

Figure 5D:
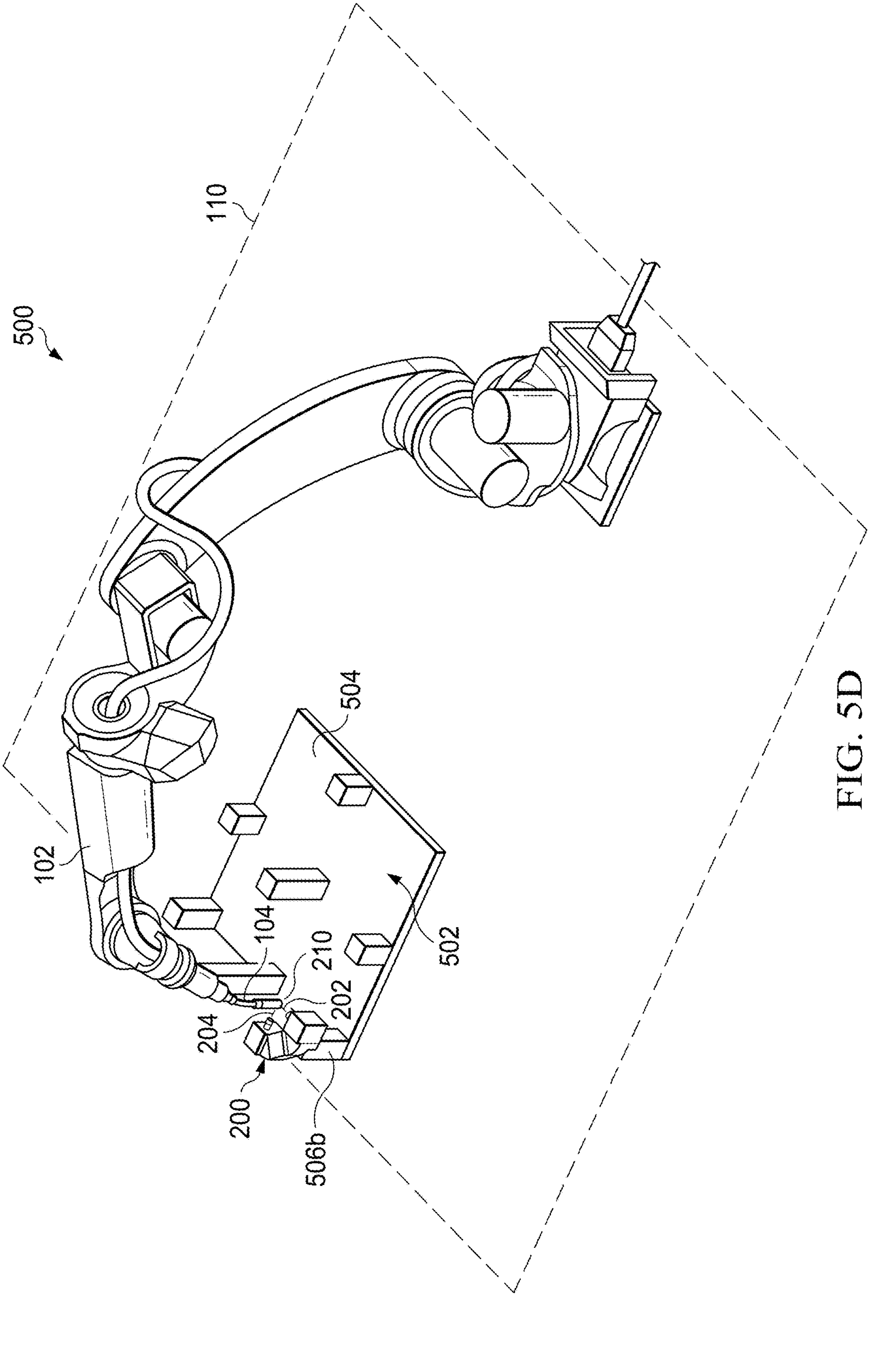
FIG. 5D is a diagram illustrating the use of the mastering system to master the robot, in accordance with embodiments of the disclosure.

FIG. 5D depicts the robot 102 after being manually jogged to align with the intersection point 210 of laser beams 202, 204, with the laser-emitting device 200 positioned on a second riser 506*b*. With the tool tip 104 in this position, the operator may perform mastering operations. For example, the operator may adjust the configuration of the joints (see joints 106 of FIG. 1A) of the robot 102 to remaster the robot 102. In some embodiments, the joint angles of the robot 102 are recorded while the tool tip 104 is at the known spatial position defined by the intersection point 210 of the laser beams 202, 204. These joint angles may be stored in the memory of the control system 108 and compared to expected joint angles for the robot 102 when it is known to be correctly mastered (for example, by solving an inverse kinematic model of the robot 102 with respect to a previously established TCP and user-defined coordinate system 508 for the correctly mastered robot 102).

As another example, joint mastering offsets may be determined and used to correct the joint configuration of the robot 102. For example, joint angle deviations $(\Delta\theta)_i$ may be determined for each joint of the robot 102 by comparing observed or recorded joint angles to expected values from when the robot 102 was correctly mastered. These deviations may be applied as joint mastering offsets by either updating the internal joint configuration of the robot 102 and/or its internal kinematic configuration. This approach can restore accurate forward kinematics for the robot 102 without relying on factory mastering data, internal encoder values, or external sensors.

As yet another example, the operator may remaster the robot 102 by adjusting encoder pulse counts when the tool tip 104 is at the precisely known intersection point 210. To do this, the operator views the encoder pulse counts for the joints of robot 102 while the tool tip 104 is aligned at the intersection point 210 of the laser beams 202, 204. The operator then adjust the encoder counts to a remastered value for these coordinates in the workspace 110. For example, the operator may adjust the encoder pulse counts to match those previously recorded at these physical coordinates when the robot 102 was known to be correctly mastered. In this way the robot 102 can be remastered at the encoder level without requiring any reprogramming of underlying models, sensor feedback, mathematical calculations, or external calibration aids.

This process may be repeated at each of the risers to adjust internal configuration data of the robot 102 based on the laser-defined positions established for each riser. Using the laser-emitting device 200 on the risers to establish a set of well-defined physical points in the workspace offers significant advantages for remastering the robot 102. This approach ensures high repeatability and accuracy, as the intersection point 210 of the laser beams 202, 204 serves as a precise, easily identifiable reference that is not subject to drift or ambiguity. By providing consistent and reproducible locations for the tool tip 104 to align with, the system 500 minimizes human error and reduces the need for complex calculations or external calibration tools. As a result, remastering can be performed more efficiently and with greater confidence in the positional integrity of the robot 102 within its workspace 110.

To validate the quality of the robot's mastering, deviation mapping may be performed by commanding the robot 102 to move the tool tip 104 along a laser-defined path (for example, one of the paths 402 or 404 of FIGS. 4A and 4B). Deviations between the position of the tool tip 104 and the position of the laser beam 202, 204 along the path are measured (for example, in millimeters or another appropriate unit) and recorded. Based on these deviations, an estimated accuracy of the robot 102 can be determined without using sensors or external measurement tools. For example, the robot 102 may be deemed to have high accuracy if deviations are consistently less than a specified threshold (such as 0.1 mm), moderate accuracy if deviations are within a certain range (such as 0.1 mm to 0.5 mm), and low accuracy if deviations exceed a higher threshold (such as 0.5 mm), indicating a need for further mastering.

Tests were performed to validate a remastered robot. Table 1 below shows results for such a test, including the actual position versus target position in terms of XYZ coordinates and rotational components of $R_x$ (roll), $R_y$ (pitch) and $R_z$ (yaw). Table 2 shows similar results presented as joint angles for each of the six joints ($J_1$ to $J_6$) of the 6-axis robot.

TABLE 1

Actual versus target robot position and pose.

| | Actual | Target/Theoretical |
|---|---|---|
| X | 202.367 | 200.00 |
| Y | 353.881 | 350.00 |
| Z | 128.174 | 130.00 |
| $R_X$ | −0.952 | 0.0 |
| $R_Y$ | 88.235 | 90.0 |
| $R_Z$ | 0.844 | 0.0 |

TABLE 2

Actual versus target robot joint angles for joints $J_1$ to $J_6$.

| | Actual | Target/Theoretical |
|---|---|---|
| $J_1$ | −8.164 | −18.487 |
| $J_2$ | 34.692 | 40.932 |
| $J_3$ | 28.790 | −14.213 |
| $J_4$ | −4.796 | −24.313 |
| $J_5$ | −39.511 | −91.203 |
| $J_6$ | 11.28 | 5.318 |

The following equation was used to compute a deviation angle or mastering correction offset (Δθi) for each joint (i) of the robot:

$$\Delta\theta_i = \frac{1}{N}\sum_{k=1}^{N}\left(\theta_{i,k}^{actual} - \theta_{i,k}^{expected}\right)$$

These mastering correction offsets were then applied to remaster the robot as described above.

Validation testing was conducted to assess the effectiveness of the calibration and remastering procedures described in this disclosure across multiple industrial robots operating in production-relevant environments. Using a shared fixture and laser-defined geometry, identical robot programs were successfully transferred between different robots without the need for CAD alignment or recalibration. The disclosed methods yielded consistent and repeatable motion across various workplaces. Accuracy was visually verified along the projected laser geometry, with only sub-millimeter deviations observed over extended paths. Notably, no sensor input, CAD reference, or digital model were required during setup, teaching, or verification. These results demonstrate that the spatial behavior of the robot can be reliably aligned to external physical reality using laser-defined targets, thereby enabling accurate motion without the need for internal kinematic adjustments or reprogramming.

The technical advantages provided by the present disclosure, in various embodiments, include: (i) precise, sensor-less teaching of TCPs through the angular convergence of intersecting laser beams; (ii) robust, sensor-less definition of user coordinate systems by traversing the tool along laser-defined linear paths, thereby establishing coordinate systems directly from physical geometry; (iii) visual path verification utilizing photo-reactive materials, which allows for direct observation of motion alignment independent of sensors or software feedback; (iv) elimination of reliance on CAD, offline programs, NC blocks, or digital tool data by deriving spatial truth solely from the TCP; (v) efficient support for robot relocation by enabling user coordinate system teaching before and after a move, followed by application of spatial transformation to existing robot programs; (vi) robust mastering validation and recovery through computation of joint offset corrections based on known spatial positions, enabling realignment without factory mastering fixtures or internal encoder tools; and (vii) demonstrated sub-millimeter accuracy achieved exclusively through physical geometry in repeated field tests, thereby obviating the need for CAD, sensors, mastering tools, and digital alignment routines.

In some embodiments, the present disclosure further contemplates a kit comprising the laser-emitting device 200 and instructions for performing any of the methods described herein. The instructions may be provided in a variety of formats, including but not limited to printed manuals, quick-start guides, or step-by-step written procedures. Alternatively, the instructions may be delivered electronically, for example, as a digital document stored on a physical medium (such as a USB drive or optical disc) included in the kit, or as a link or QR code directing the user to a website or online portal where the instructions can be accessed or downloaded. In certain embodiments, the instructions may be provided in the form of a video tutorial, which may be accessed via a web link, a downloadable file, or a preloaded video on an included electronic device. The instructions may also be conveyed through interactive software applications, mobile apps, or augmented reality (AR) experiences that guide the user through the setup and operation of the laser-emitting device 200 and the execution of the disclosed methods. In all such embodiments, the instructions are sufficient to enable a user to perform the methods described herein, and may include troubleshooting tips, safety information, and best practices for optimal use of the kit components.

Figure 6:
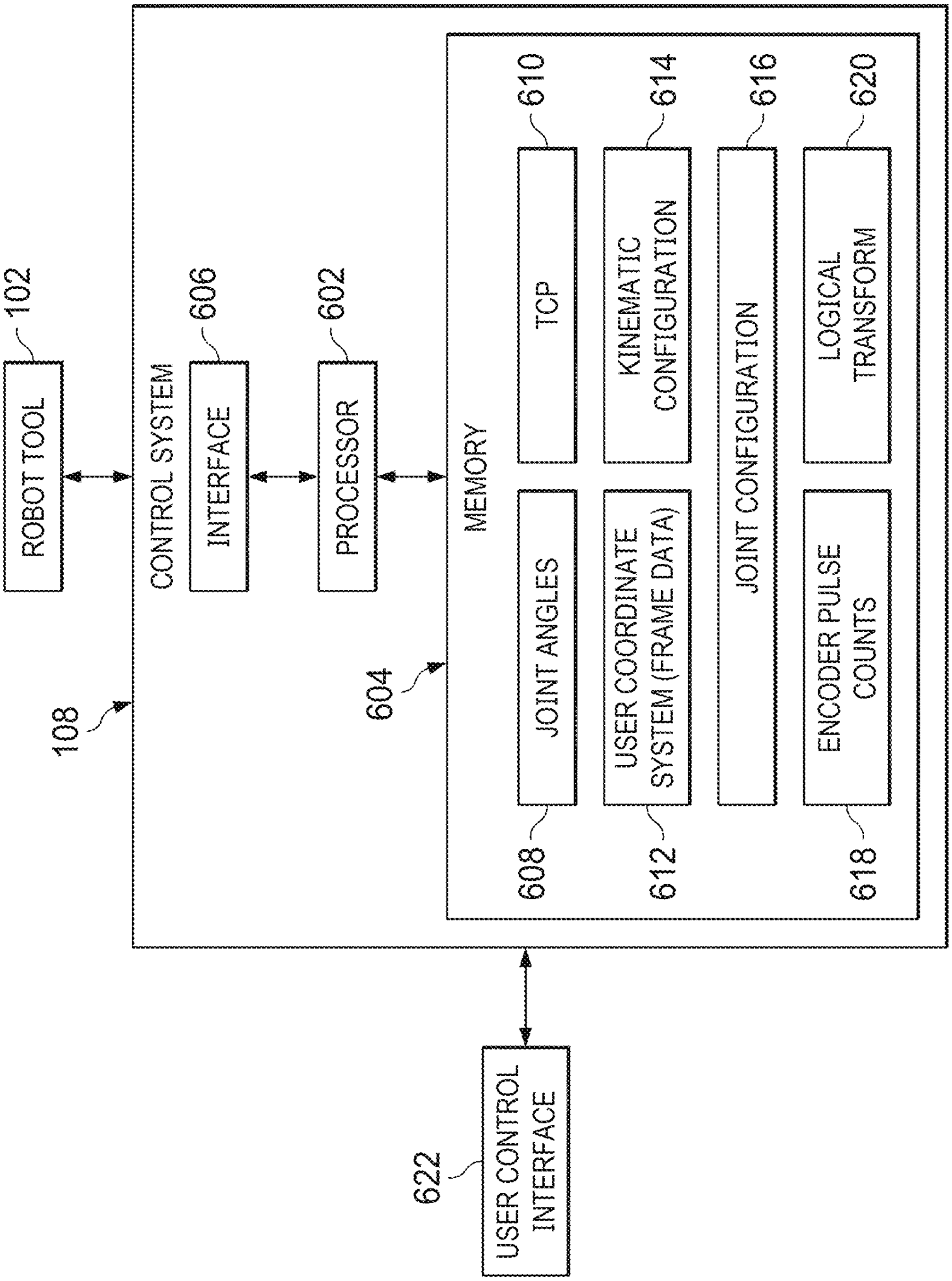
FIG. 6 is a block diagram illustrating the calibration and mastering system of FIG. 1, with additional components of the control system shown.

FIG. 6 illustrates an example control system 108. The control system 108 may include processing circuitry 602, memory 604, and a communications interface 606. The processing circuitry 602 may include one or more processors, and encompasses any suitable electronic circuitry, such as state machines, one or more central processing unit (CPU) chips, logic units, cores (e.g., a multi-core processor), field-programmable gate array (FPGAs), application-specific integrated circuits (ASICs), digital signal processors (DSPs), neural processing units (NPUs), graphics processing units (GPUs), tensor processing units (TPUs), or similar devices. The processing circuitry 602 may be implemented as a programmable logic device, a microcontroller, a microprocessor, or any suitable combination thereof. The processing circuitry 602 is communicatively coupled to and in signal communication with the memory 604. The processors are configured to process data and may be implemented in hardware and/or software. For example, the processing circuitry 602 may be of any suitable architecture, such as 8-bit, 16-bit, 32-bit, 64-bit. The processing circuitry 602 may include an arithmetic logic unit (ALU) for performing arithmetic and logic operations, processor registers for supplying operands to the ALU and storing results, and a control unit that fetches instructions from memory 604 and executes them by directing the coordinated operations of the ALU, registers, and other components.

The memory 604 may include any logic, instructions, code, and/or rules for implementing the functions described herein. The memory 604 may include one or more disks, tape drives, or solid-state drives for program storage and for storing instructions and data accessed during program execution. The memory 604 may be volatile or non-volatile and may include, for example, read-only memory (ROM), random-access memory (RAM), ternary content-addressable memory (TCAM), dynamic random-access memory (DRAM), and static random-access memory (SRAM).

The memory 604 of the control system 108 stores a variety of data and parameters for accurate calibration, mastering, and operation of the robot 102. For example, the memory 604 may store joint angles 608 established during initial calibration or subsequent remastering of the robot 102. These joint angles represent the precise positions of each robot joint at key reference points and ensure that the robot's internal model is aligned with its physical configuration. Additionally, the memory 604 may store a TCP 610, which may include the set of joint angles, kinematic model parameters, and other data defining the spatial location and orientation of the TCP relative to the robot's base or another reference frame. The TCP is established during the calibration procedure in which the user teaches the robot the exact position of the tool tip and is used as a reference for subsequent motion planning and execution.

The memory 604 may also store a user coordinate system 612, which is often defined by the user along specific axes (such as X and Y elongators, as shown in FIGS. 4A and 4B) to provide a custom reference frame for programming and operation. This user coordinate system 612 may be implemented as a frame file generated during calibration by teaching the robot positions along the desired axes, thereby simplifying programming and ensuring that movements are specified relative to the user's workspace.

Furthermore, the memory 604 may include a kinematic configuration 614, which encompasses the robot's mathematical model of its geometry and motion. This kinematic configuration 614 may include parameters for the robot's kinematic model, such as physical parameters (e.g., link lengths, joint offsets, and the arrangement of joints forming the robot's kinematic chain), as well as other geometric data. This kinematic configuration 614 may also include the reference (zero) positions for each joint, established during mastering or calibration. This kinematic configuration 614 enables the control system 108 to accurately compute the spatial position of the tool tip based on the current joint angles 608, using transformation equations (such as forward and inverse kinematics equations) that relate joint positions to the position and orientation of the tool tip in space. This allows the robot 102 to calculate the tool tip's position in space, given a set of joint angles 608, and to determine the joint angles needed to reach a desired position. This kinematic configuration 614 is typically established during initial setup and may be refined during calibration or mastering, as described above.

The memory 604 may further store a joint configuration 616, which may include joint offsets or other correction factors to compensate for mechanical tolerances or wear, thereby ensuring that commanded joint positions correspond to intended physical positions.

Encoder pulse counts 618, representing the recorded pulse counts for both the correctly mastered position and the currently observed position of the robot, are used during calibration and mastering to verify and adjust the robot's internal position tracking. The memory 604 may also store a logical transform 620, which is used to adjust an existing user coordinate system to an altered workspace, as previously described. This is particularly useful after a workspace is modified, allowing the control system 108 to maintain accurate positioning with minimal recalibration when workspaces are altered. Collectively, these stored data and parameters enable precise calibration, mastering, and operation of the robot 102, ensuring that its movements are both accurate and repeatable.

The communications interface 606 is configured to enable wired and/or wireless communication with other devices or systems. The communications interface 606 may include a hardware interface, such as a Universal Serial Bus (USB) interface, a parallel interface, or similar. The processing circuitry 602 may send and receive data using the communications interface 606, which may be configured to use any suitable communication protocol. In some embodiments, the communications interface 606 may include a network interface, such as a Wi-Fi interface, a local area network (LAN) interface (e.g., Ethernet), a wide area network (WAN) interface, a modem, a switch, or a router. The communications interface 606 may communicate with a user control interface 622, which provides an accessible means for an operator to interact with and control the robot 102. The user control interface 622 may include a graphical user interface (GUI) displayed on a touchscreen, physical buttons, a joystick, or another input device, allowing the user to manually jog the robot 102 for calibration and mastering procedures. Through this user control interface 622, the operator can incrementally adjust the robot's position, record reference points, and initiate calibration routines, thereby facilitating precise setup and alignment of the robot 102 within its workspace.

As used herein, "jogging" refers to the act of incrementally moving one or more joints of the robot by direct operator input, typically via a user control interface (e.g., interface 622 of FIG. 6), to adjust the position and/or orientation of the tool tip 104 within the workspace. This movement is performed in real time by the operator, who observes the robot's motion and provides input commands to achieve a desired position or alignment.

The term "photo-responsive material" refers to any material or surface that exhibits a detectable change in a physical property (such as color, fluorescence, reflectivity, or electrical conductivity) in response to exposure to light, including but not limited to visible, ultraviolet, or infrared laser illumination. In the context of this disclosure, a photo-responsive material may be used as a target or reference point for laser alignment or calibration procedures.

As used herein, a "logical transform" refers to a computational operation or set of operations that defines a mapping between two coordinate systems, such as the transformation between the robot's internal coordinate system established for an original workspace configuration and the coordinate system of after the workspace has been altered, for instance, by adding, changing, or removing fixtures in the workspace. The logical transform may be represented by a transformation matrix or a set of equations, and is used by the control system to recalculate or adjust the robot's movements to maintain accurate positioning after a change in workspace or reference frame.

As used herein, the term "elongator" refers to the portion of laser light that extends along the laser beam path. The elongator is not a physical component or adapter, but rather the emitted laser beam itself, which serves as a spatial reference for alignment, calibration, or measurement procedures. The elongator may be characterized by its length, direction, and interaction with photo-responsive materials or other targets within the workspace.

As used herein, the phrase "substantially the same" is used to indicate that two or more items, positions, or values are sufficiently similar for the intended technical purpose, allowing for variations that do not materially affect the outcome of the calibration or operation.

As used herein, the term "known spatial positions" refers to positions within the workspace whose coordinates are either predetermined, measured, or otherwise established with respect to a defined reference frame. "Known spatial positions" may be determined by the intersection point of laser beams emitted by the laser-emitting device.

As used herein, the term "adjusted position" refers to a position of the tool tip or another component of the robot that has been modified or corrected, typically by manually jogging the robot to align the tool tip with a laser beam or the intersection point of two laser.

The actual software code or specialized control hardware used to implement these systems and methods is not limiting of the methods and embodiments described herein. Accordingly, the operation and behavior of the systems and methods are described without reference to specific software code, it being understood that software and control hardware can be designed to implement the systems and methods based on the description provided herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable medium includes both computer storage media and tangible storage media that facilitate transfer of a computer program from one place to another. A non-transitory processor-readable storage medium may be any available medium that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc, laser disc, optical disc, digital versatile disc, floppy disk, and Blu-ray disc, where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The block diagram in the Figures illustrate the architecture, functionality, and operation of possible implementations of systems, methods, and computer program products according to various embodiments of the present invention. In this regard, each block in the block diagram may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram, and combinations of blocks in the block diagram, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for restoring joint mastering of a robot comprising a tool tip, a plurality of joints, and a control system a processor and a memory storing configuration data and encoder pulse counts associated with a previously established tool center point (TCP), the control system connected to a user control interface, the method comprising:

causing, by the control system, a laser-emitting device to emit at least two laser beams that intersect at an intersection point within a workspace corresponding to the previously established TCP;

jogging, by the control system, via the user control interface, one or more joints of the robot to align the tool tip with the intersection point; and for each joint, adjusting, by the control system, a joint mastering value by incrementally moving the joint until an encoder pulse count of the joint matches a previously recorded pulse count associated with the previously established TCP, wherein the encoder pulse counts comprise a set of encoder pulse counts stored for the plurality of joints in association with the previously established TCP, wherein, after the tool tip is aligned with the intersection point, the joint mastering value for each joint is adjusted until the encoder pulse count of the joint matches a respective encoder pulse count in the set of encoder pulse counts.

2. The method of claim 1, wherein aligning the tool tip comprises:

providing on the tool tip a light-responsive material to change appearance when struck by at least one of the two laser beams; or projecting at least one of the two laser beams onto an object to form a laser spot and detecting alignment by observing reduction in size of the spot when the tool tip obstructs the at least one of the two laser beams.

3. A system for restoring joint mastering of a robot, the robot comprising:

a tool tip;

a plurality of joints; and a control system comprising a processor and a memory storing configuration data and encoder pulse counts associated with a previously established tool center point (TCP);

a user control interface connected to the control system, and a laser-emitting device configured to emit at least two laser beams that intersect at an intersection point within a workspace of the robot, wherein the intersection point corresponds to the previously established TCP;

wherein the control system is configured to:

jog, via the user control interface, one or more joints of the robot to align the tool tip with the intersection point; and for each joint, adjust a joint mastering value by incrementally moving the joint until an encoder pulse count of the joint matches a previously recorded pulse count associated with the previously established TCP, wherein the encoder pulse counts comprise a set of encoder pulse counts stored for the plurality of joints in association with the previously established TCP, wherein, after the tool tip is aligned with the intersection point, the joint mastering value for each joint is adjusted until the encoder pulse count of the joint matches a respective encoder pulse count in the set of encoder pulse counts.

4. The system of claim 3, wherein:

the tool tip comprises a light-responsive material to change appearance when struck by at least one of the two laser beams; or the system further comprises an object to form a laser spot positioned in the workspace to detect alignment by observing reduction in size of the spot when the tool tip obstructs the at least one of the two laser beams.

* * * * *